United States Patent [19]
Nakamura et al.

[11] Patent Number: 6,016,548
[45] Date of Patent: *Jan. 18, 2000

[54] APPARATUS FOR CONTROLLING DUTY RATIO OF POWER SAVING OF CPU

[75] Inventors: Nobutaka Nakamura; Masayo Yamaki, both of Tokyo, Japan

[73] Assignee: Kabushiki Kaisha Toshiba, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,926

[22] Filed: Jul. 15, 1997

Related U.S. Application Data

[62] Division of application No. 08/364,720, Dec. 27, 1994, Pat. No. 5,706,407.

[30] Foreign Application Priority Data

Dec. 28, 1993 [JP] Japan .................................. 5-351165
Sep. 30, 1994 [JP] Japan .................................. 6-235794
Sep. 30, 1994 [JP] Japan .................................. 6-238121

[51] Int. Cl.[7] .............................. G06F 1/00; G06F 17/20
[52] U.S. Cl. ........................ 713/323; 713/321; 713/322; 713/501; 713/503; 711/101; 710/260; 710/261; 710/266; 710/267; 307/125; 327/544; 375/354
[58] Field of Search ........................ 395/750.04, 750.05, 395/550, 551, 750, 733, 734, 739, 740; 713/321, 322, 501, 503, 323; 711/101; 327/544; 307/125; 375/354; 710/266, 267, 261, 260

[56] References Cited

U.S. PATENT DOCUMENTS

| | | | |
|---|---|---|---|
| 4,569,048 | 2/1986 | Sargeant | 714/29 |
| 4,787,032 | 11/1988 | Culley | 364/200 MS |
| 4,851,987 | 7/1989 | Day | 713/601 |
| 4,980,836 | 12/1990 | Carter et al. | 364/483 |
| 4,980,850 | 12/1990 | Morgan | 364/900 |
| 5,012,408 | 4/1991 | Conroy | 364/200 |
| 5,025,387 | 6/1991 | Frane | 364/493 |
| 5,040,153 | 8/1991 | Fung et al. | 365/230.03 |
| 5,056,009 | 10/1991 | Mizuta | 364/200 |
| 5,086,387 | 2/1992 | Arroyo et al. | 713/501 |
| 5,129,069 | 7/1992 | Helm et al. | 395/400 |
| 5,167,024 | 11/1992 | Smith et al. | 395/375 |
| 5,175,830 | 12/1992 | Sherman et al. | 711/2 |
| 5,203,003 | 4/1993 | Donner | 712/1 |
| 5,218,704 | 6/1993 | Watts, Jr. et al. | 713/300 |
| 5,241,680 | 8/1993 | Cole et al. | 713/322 |
| 5,269,010 | 12/1993 | MacDonald | 395/425 |
| 5,291,528 | 3/1994 | Vermeer | 375/354 |
| 5,359,719 | 10/1994 | Chang et al. | 395/400 |
| 5,359,727 | 10/1994 | Kurita et al. | 395/550 |
| 5,369,771 | 11/1994 | Gettel | 713/322 |
| 5,392,437 | 2/1995 | Matter et al. | 395/750 |

(List continued on next page.)

FOREIGN PATENT DOCUMENTS 1-260517  10/1989  Japan .
5-289786  11/1993  Japan .

OTHER PUBLICATIONS

Nikkei Electronics, Jul. 5, 1993 (No. 585), pp. 171–178.

SL Enhanced Intel 486TM Microprocessor Family (Intel Corporation) 1993.

Primary Examiner—Ayaz R. Sheikh
Assistant Examiner—Frantz Blanchard Jean
Attorney, Agent, or Firm—Limbach & Limbach L.L.P.

[57] ABSTRACT

A computer system capable of entering a sleep mode is disclosed. The rate at which the computer switches between a normal state and a stop grant state while in the sleep mode is controllable by a timer. The stop grant state is an intermediate power consumption state between the sleep mode and the normal state. The timer may include a software system management interrupt timer. The system may also include processing to determine the cause of the switch from the stop grant state to the normal state.

17 Claims, 16 Drawing Sheets

U.S. PATENT DOCUMENTS

| | | | |
|---|---|---|---|
| 5,426,755 | 6/1995 | Yokouchi et al. | 711/101 |
| 5,434,996 | 7/1995 | Bell | 395/550 |
| 5,461,266 | 10/1995 | Koreeda et al. | 307/125 |
| 5,473,767 | 12/1995 | Kardach et al. | 395/550 |
| 5,475,847 | 12/1995 | Ikeda | 713/322 |
| 5,513,331 | 4/1996 | Pawlowski et al. | 395/401 |
| 5,522,062 | 5/1996 | Yamaki | 395/497.03 |
| 5,535,368 | 7/1996 | Ho et al. | 395/497.01 |
| 5,546,568 | 8/1996 | Bland et al. | 713/501 |
| 5,560,001 | 9/1996 | Kardach et al. | 395/550 |
| 5,560,002 | 9/1996 | Kardach et al. | 395/550 |
| 5,566,309 | 10/1996 | Tamura | 395/405 |
| 5,572,692 | 11/1996 | Murdoch et al. | 395/405 |
| 5,625,826 | 4/1997 | Atkinson | 713/322 |
| 5,630,052 | 5/1997 | Shah | 714/38 |
| 5,630,107 | 5/1997 | Carmean et al. | 713/601 |
| 5,657,482 | 8/1997 | Klein | 713/503 |

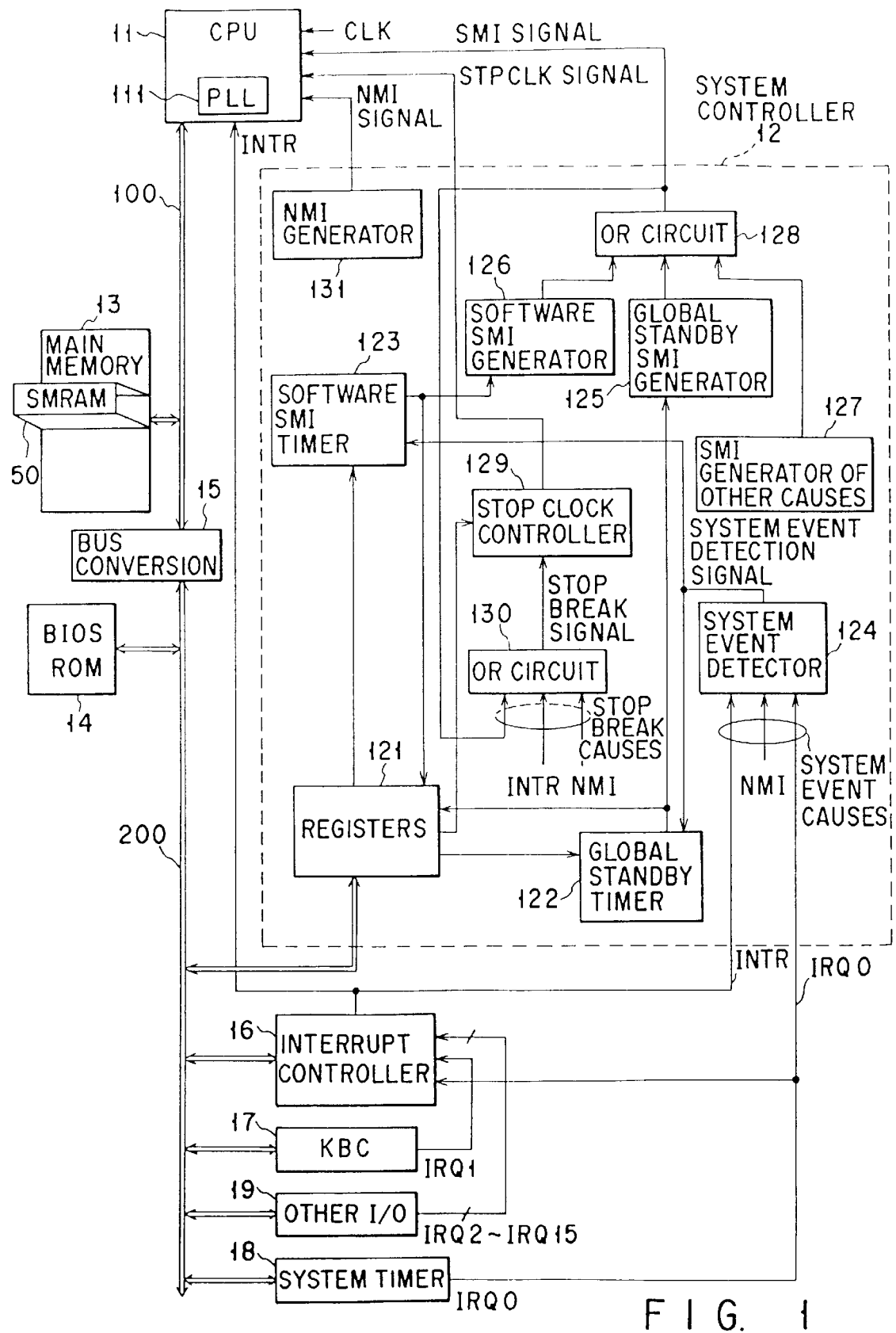
F I G. 1

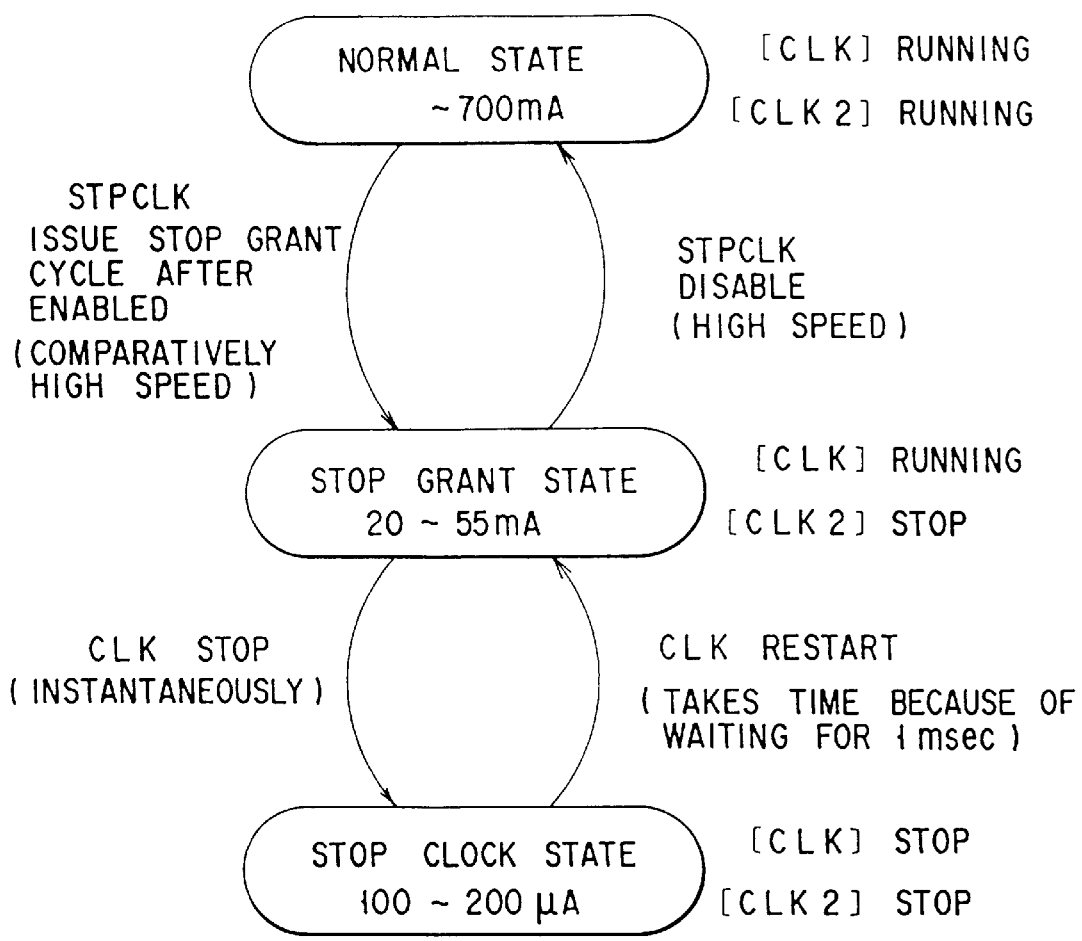
F I G. 2

FIG. 3A IRQ0
FIG. 3B INTR

WHERE LEVEL IS RETAINED

REGARD AS NOT SYSTEM EVENT FOR FIRST TIME

REGARD AS SYSTEM EVENT FOR SECOND TIME

FIG. 3C IRQ0
FIG. 3D INTR

WHERE LEVEL IS TURNED L HALFWAY

NOT SYSTEM EVENT

NOT SYSTEM EVENT

FIG. 3E IRQ1
FIG. 3F IRQ0
FIG. 3G INTR

KBC OUTPUTS

55msec (SIGNAL OF DUTY RATIO 50% OUTPUT FROM TIMER(82C54 EQUIVALENTS))

A: TIMER PROCESS BY BIOS EVEN AFTER A IS ENDED, IRQ0=H IS RETAINED (∵TIMER PROCESS TAKES NOT MORE THAN 27 msec)

B: KBC PROCESS BY BIOS WHEN B IS ENDED, IRQ1 TURNED L

INTR AT LEADING EDGE OF IRQ0

INTR AT LEADING EDGE OF IRQ1

ISSUE EOI

ISSUE EOI

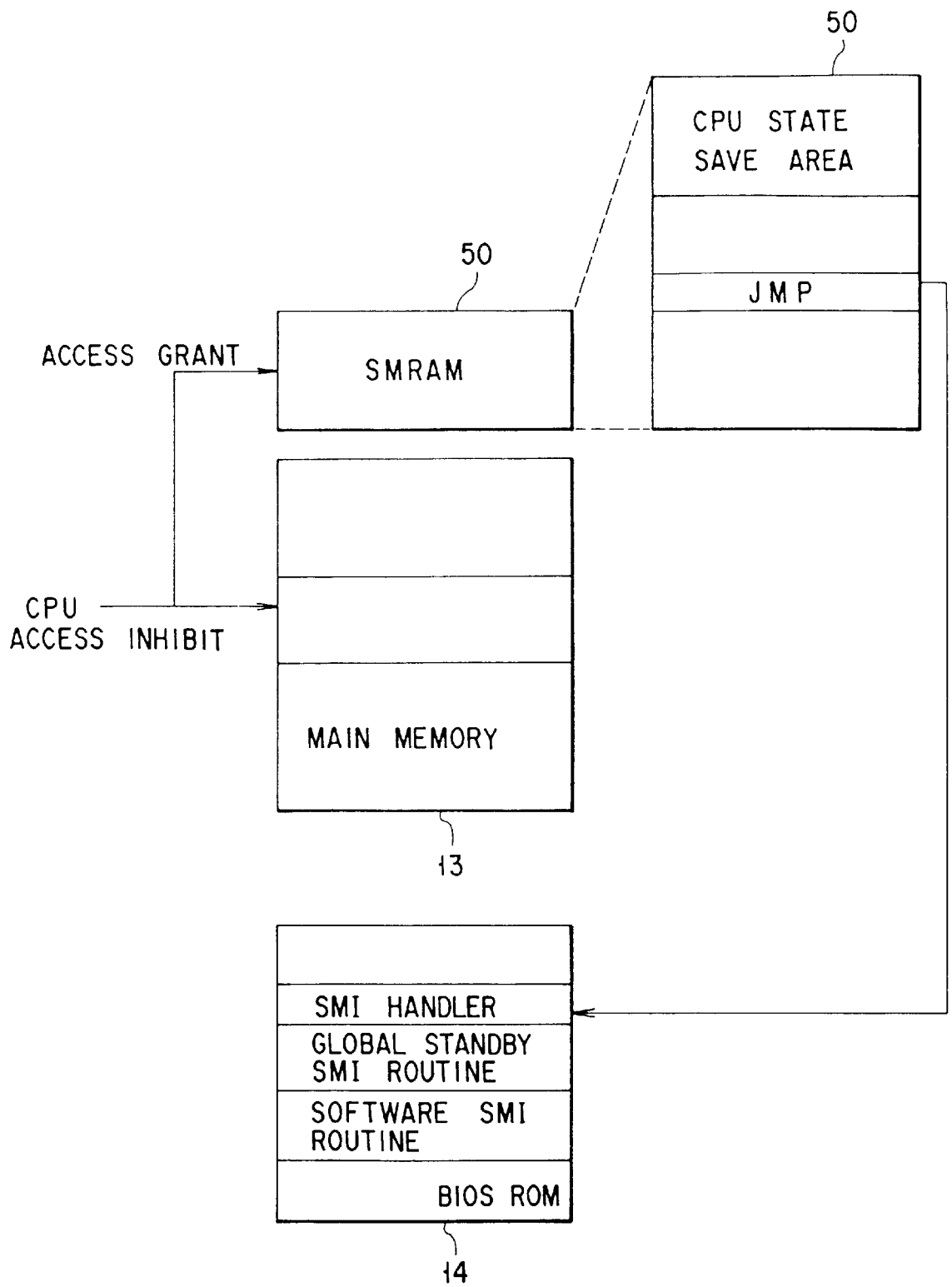
F I G. 4

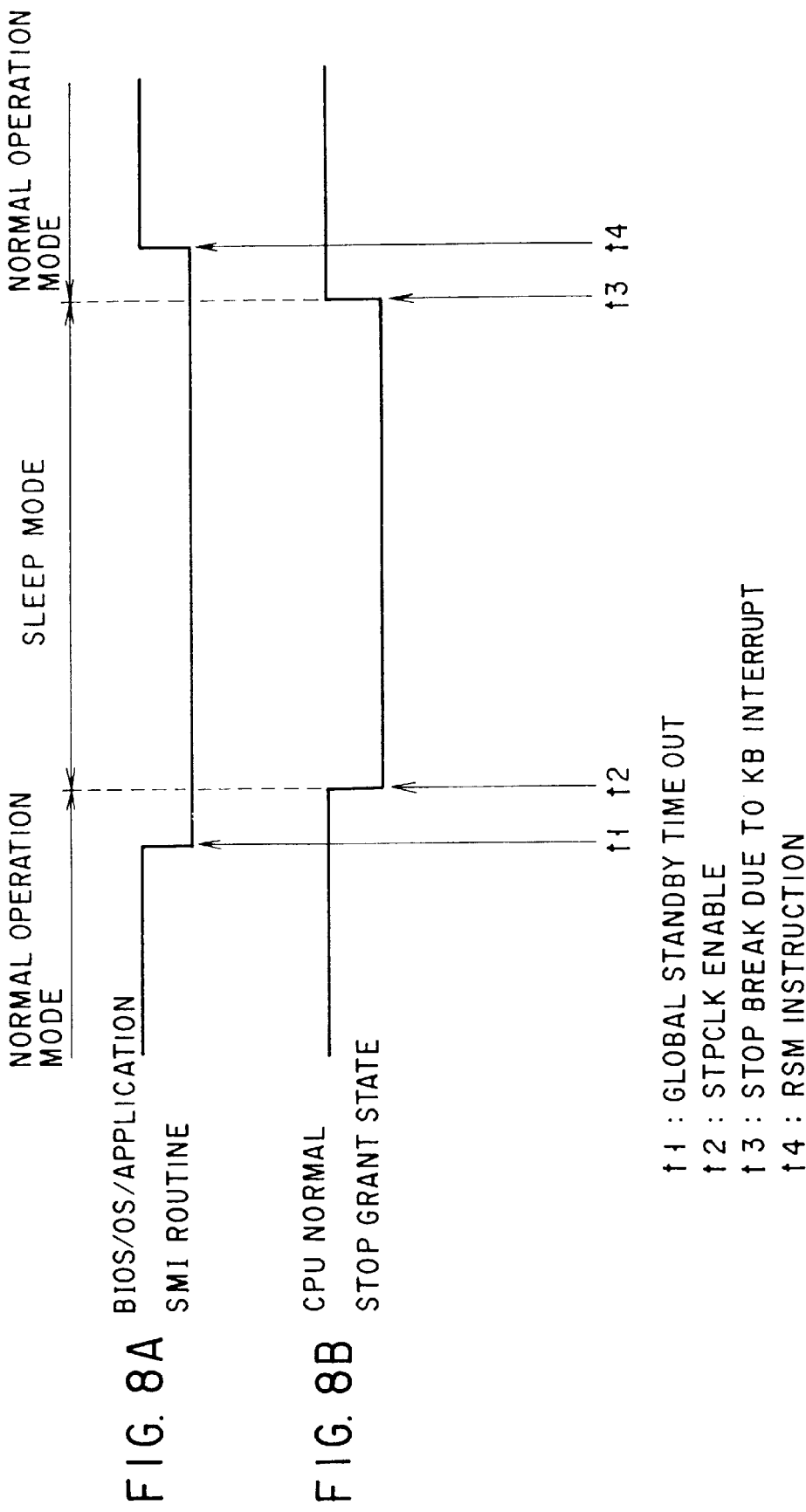

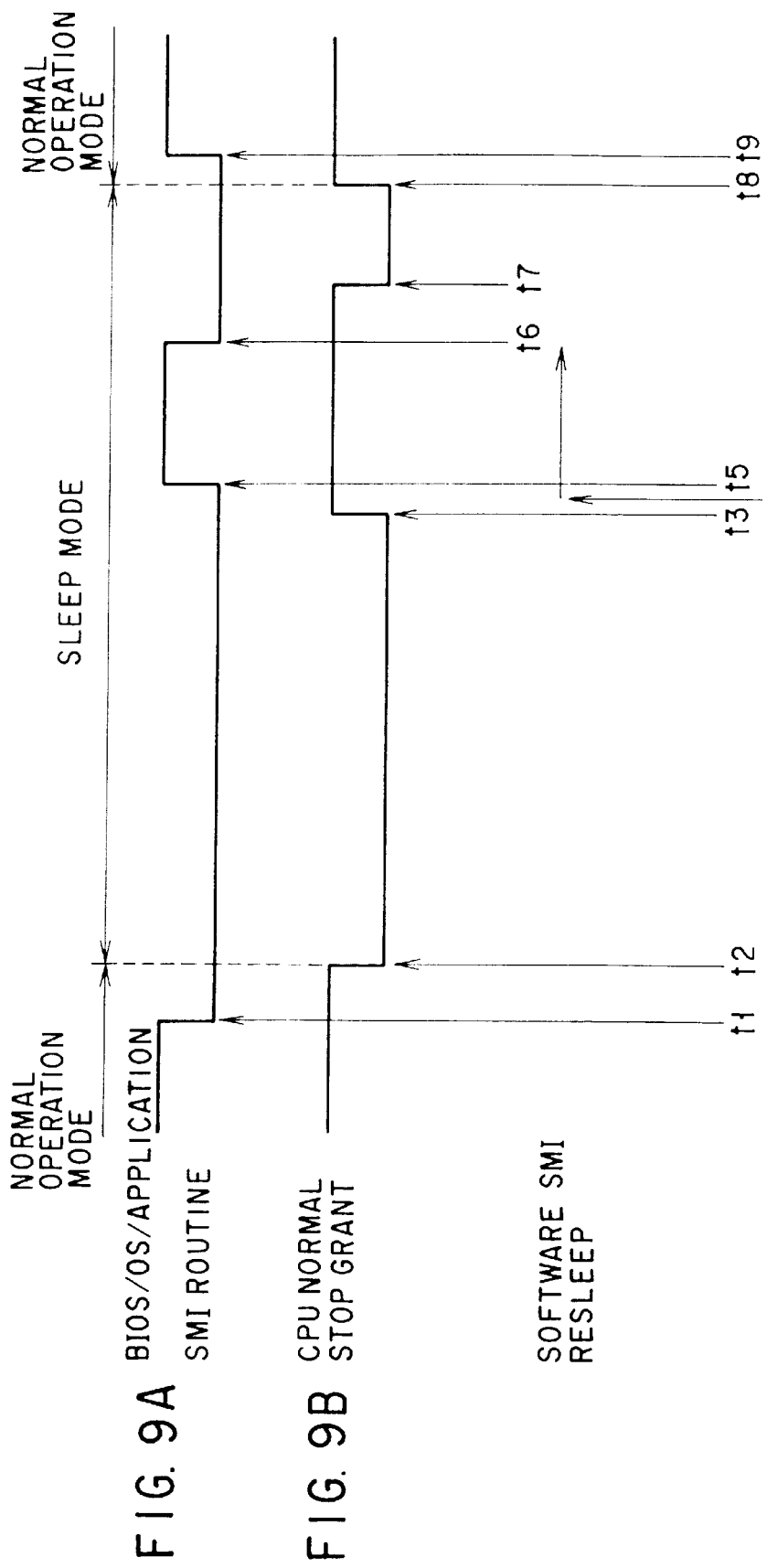

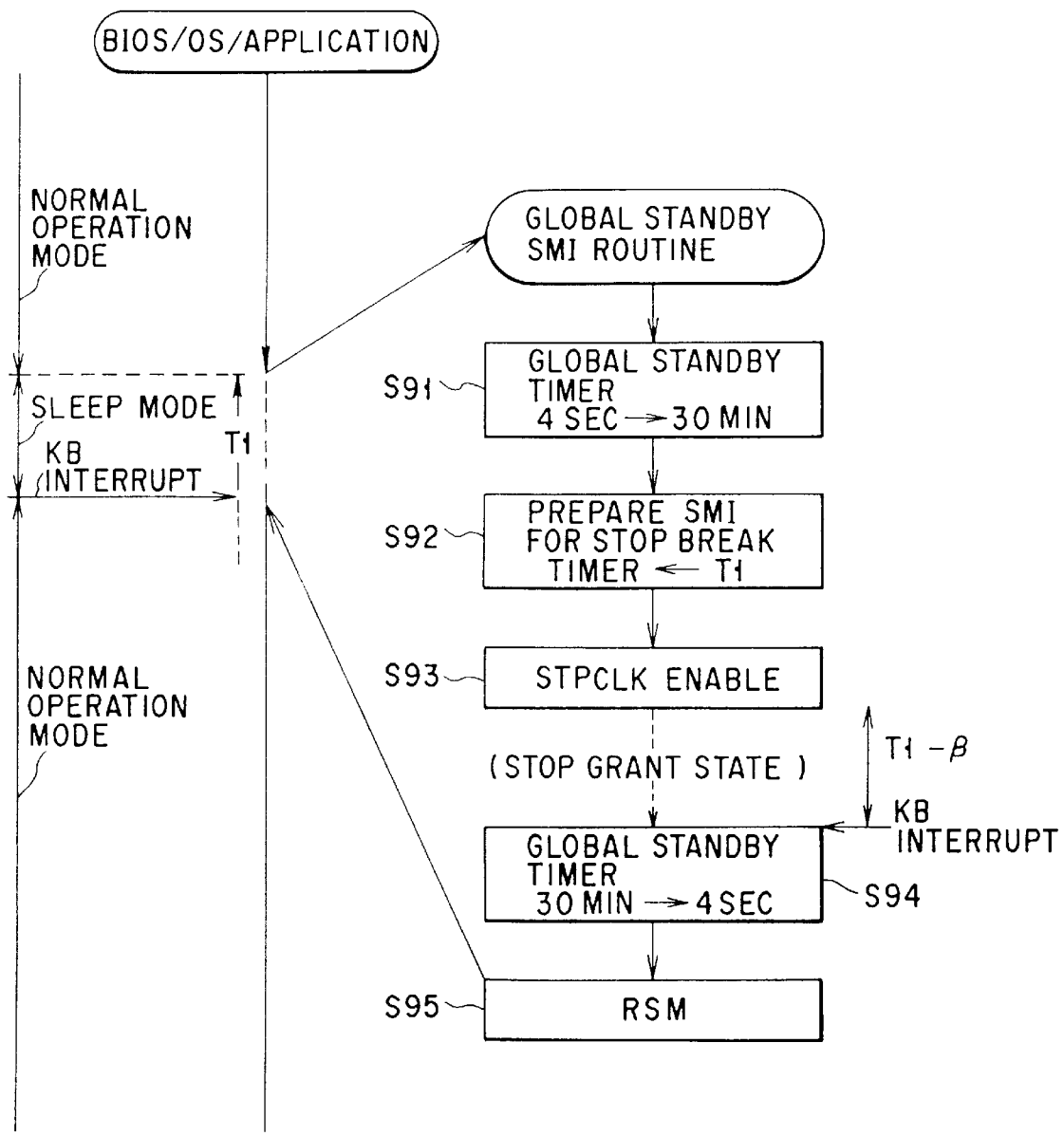
F I G. 14

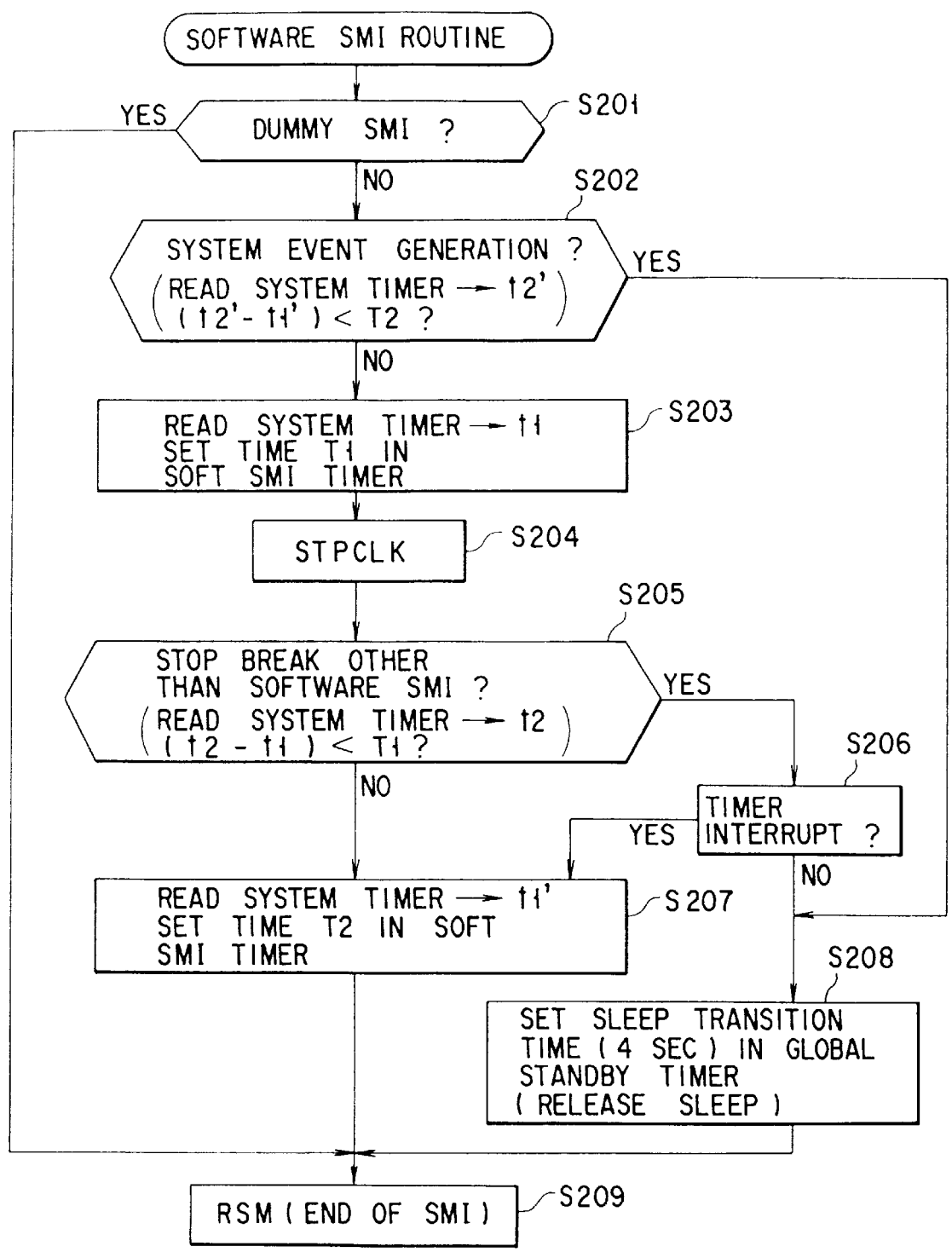
F I G. 16

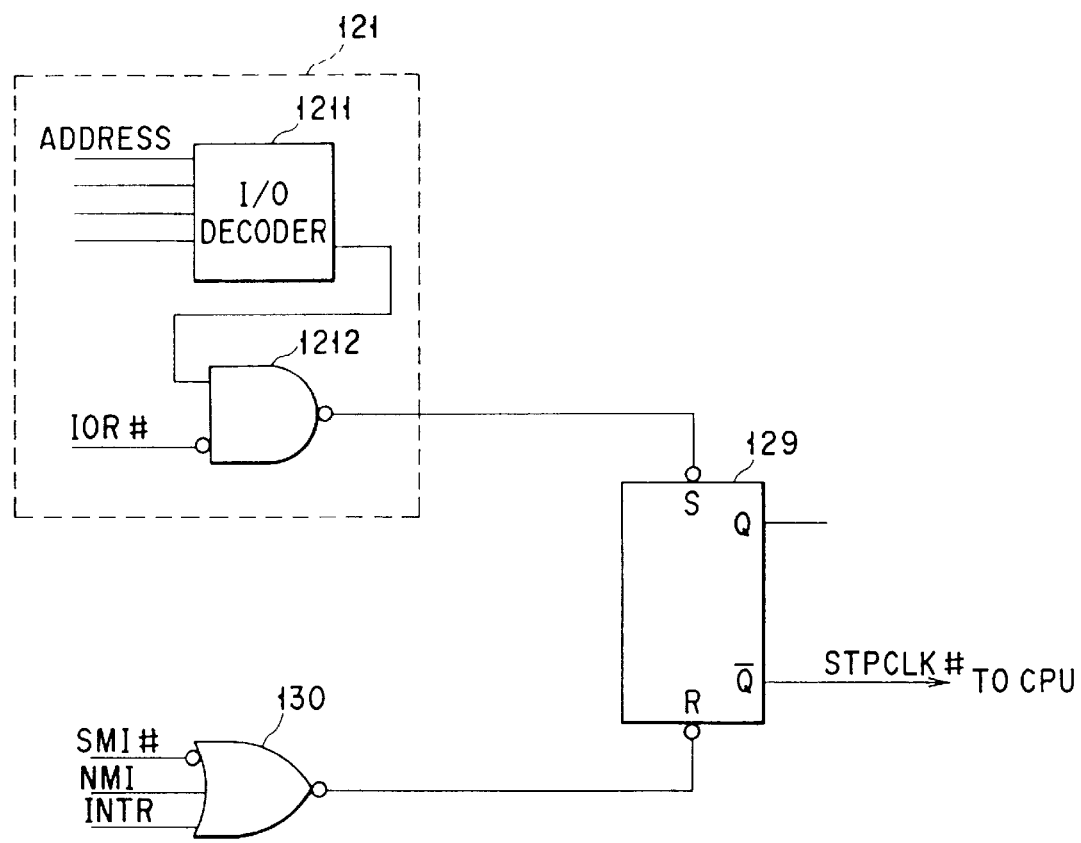
F I G. 17

APPARATUS FOR CONTROLLING DUTY RATIO OF POWER SAVING OF CPU

This is a divisional of Application Ser. No. 08/364,720, filed Dec. 27, 1994 U.S. Pat. No. 5,706,407.

BACKGROUND OF THE INVENTION

1. Field of the Invention

The present invention relates generally to a laptop type or notebook type portable personal computer system, and, more particularly, a computer system capable of controlling the operation speed of a CPU to reduce consumed power.

2. Description of the Related Art

Recently, various laptop or notebook type personal portable computers have been developed which are easily portable and operable on battery power. To reduce wasteful consumed power, such a type of portable computer is equipped with a so-called CPU sleep mode function to automatically disable the CPU under a predetermined condition.

A conventional CPU sleep mode function is executed under the condition that no keyboard operation is performed by an operator for more than a given period of time.

More specifically, when an application program waits for a key input, INT16H of BIOS (Basic I/O System) is called and a keyboard control routine is executed. The BIOS's keyboard control routine causes the CPU to run a HALT command to stop executing a program when there is no keyboard input within a given period of time. When the system hardware detects the HALT cycle of the CPU, the system hardware lowers the clock frequency or completely disable the clock, and sets the CPU in the sleep mode, in order to reduce the CPU's consumed power. With the CPU in sleep mode, no program is executed at all by the CPU regardless of whether the clock frequency is reduced or the clock is completely disabled.

An idle state of the CPU which is detectable by the conventional sleep mode function is just the CPU idle when an application program becomes ready for a keyboard input. When an application program waits for the completion of the operation of an I/O device other than the keyboard, therefore, the CPU cannot be set in the sleep mode even if the CPU is in the idle state.

In this case, the CPU power is wasted for the time needed for that I/O device to complete the operation, In particular, when an application program waits to be informed of the completion of the operation from a slow I/O device or from a high-intelligent I/O device such as a bus master, the CPU cannot be set in the sleep mode even if the CPU is in the idle state for a relatively long time. This increases the wasteful CPU power consumed.

As apparent from the above, the conventional sleep mode function cannot accomplish sufficient power saving due to few triggers to set the CPU in the sleep mode.

The BIOS can control the system hardware only under a specific operating system (OS) which is associated with that BIOS. Whether or not the sleep mode function works properly therefore depends on the OS environment greatly, and the sleep mode function may not work at all depending on the OS in use.

Further, the conventional sleep mode function takes time to wake up the CPU from the sleep mode.

When some system event occurs while the CPU is in a sleep mode, the system hardware restarts supplying a clock to the CPU or increases the clock frequency. Even if the clock is set back to the normal state, the CPU cannot start operating immediately. Particularly, the recent high-performance microprocessors equipped with a PLL (Phase Locked Loop), such as Intel 486 series microprocessors that have been developed, manufactured and sold by Intel Corporation holds the start of the CPU operation for a given period (e.g., about 1 ms) after switching the clock for the following reason.

This type of microprocessor has an internal oscillator including the PLL, which generates a fast clock synchronous with an externally supplied clock, and uses this fast clock to accomplish its fast operation. For the microprocessor to operate properly thus requires that the external supplied clock have a stable phase. Otherwise the synchronous operation of the PLL becomes unreliable. If the conventional sleep mode function that switches the CPU clock is employed in a system which uses a PLL-incorporated microprocessor as a CPU, therefore, it takes time to return from the sleep mode, thus deteriorating the system performance.

SUMMARY OF THE INVENTION

Accordingly, it is an object of the present invention to provide a computer system which can always ensure the same sleep mode regardless of the OS environment and can sufficiently reduce the CPU's power consumption.

It is another object of this invention to provide a computer system capable of quickly returning a high-performance CPU incorporating a PLL from a sleep mode.

The first feature of the present invention lies in that a computer system embodying this invention comprises a main memory for storing various programs to be executed; an overlay memory for storing a command to call a system management program, the overlay memory being mapped in a part of an address space of the main memory; a CPU having a program execution mode for running a program in the main memory and a system management mode for executing a command in the overlay memory, the CPU being switchable from the program execution mode to the system management mode in response to an interrupt signal supplied to a predetermined interrupt input terminal; CPU sleep means for executing a sleep control routine included in the system management program called by the CPU to switch an operational state of the CPU from a first state to a second state needing less power consumption than the first state; system idle detecting means for monitoring various hardware interrupt request signals to the CPU generated in the computer system and detecting a system idle when all of the hardware interrupt request signals are not generated for a predetermined first time-out time; and means for supplying an interrupt signal indicating a system idle to the predetermined interrupt input terminal of the CPU in response to detection of the system idle by the system idle detecting means, thereby causing the CPU sleep means to switch the operational state of the CPU.

In this computer system, various hardware interrupt request signals in the system are monitored, and a system idle is detected when all the interrupt request signals are not generated for a predetermined period of time, thus setting the CPU to the sleep mode. The number of triggers for setting the CPU to the sleep mode therefore increases, and the CPU can enter the sleep mode when an application program waits for the completion of the operation of an I/O device other than the keyboard as well as at the time CPU idles when the application program stands by for a keyboard input. It is therefore possible to prevent the CPU from being kept in the operational state even when the CPU is idling, thereby sufficiently reducing the power consumption.

The hardware interrupt request signals are used to detect a system idle. Those hardware interrupt request signals are physical signals generated from various I/O devices in the system, and the detection of those signals does not involve the BIOS at all. Further, the process of the CPU sleep means can be invoked only by the supply of an interrupt signal to the CPU, and the activation of this process does not involve the OS and BIOS at all. It is thus possible to detect a system idle at the hardware level and execute the CPU sleep control, thus always ensuring the same sleep mode function regardless of the OS environments.

The second feature of the computer system embodying this invention lies in the use of the CPU, which incorporates a PLL for generating an internal clock in accordance with an external clock and has operation states including a normal state in which a command is executed, a stop clock state in which execution of a command and the external clock are stopped, and a stop grant state which lies between the normal state and the stop clock state and in which execution of a command is stopped and the external clock can be enabled, whereby the CPU is set to the stop grant state from the normal state in response to generation of a stop clock signal indicating clock stop grant and is set back to the normal state from the stop grant state in response to disabling of the stop clock signal, and that the CPU sleep means sets the CPU in the clock stop grant state.

This computer system uses the stop grant state of the CPU for sleeping the CPU. In this state, any command execution is stopped, so that the consumed power of the CPU can be reduced without stopping an external clock. It is therefore possible to return the CPU from the sleep mode without dynamically switching the external clock, ensuring fast returning of the PLL-incorporated and high-performance CPU from the sleep mode.

The third feature of this invention lies in that a computer system embodying this invention comprises a CPU incorporating a PLL for generating an internal clock in accordance with an external clock and having operation states including a normal state in which a command is executed, a stop clock state in which execution of a command and the external clock are stopped, and a stop grant state which lies between the normal state and the stop clock state and in which execution of a command is stopped and the external clock can be enabled, whereby the CPU is set to the stop grant state from the normal state in response to generation of a stop clock signal indicating clock stop grant and is set back to the normal state from the stop grant state in response to disabling of the stop clock signal; stop clock signal generating means for generating the stop clock signal; a main memory for storing various programs to be executed by the CPU; an overlay memory for storing a command to call a system management program, the overlay memory being mapped in a part of an address space of the main memory, the command being executed by the CPU when an interrupt signal is supplied to a predetermined interrupt input terminal of the CPU; CPU sleep means for executing a sleep control routine included in the system management program called by the CPU to instruct the stop clock signal generating means to generate the stop clock signal; system idle detecting means for monitoring various hardware interrupt request signals to the CPU generated in the computer system and detecting a system idle when all of the hardware interrupt request signals are not generated for a predetermined time; means for supplying an interrupt signal indicating a system idle to the predetermined interrupt input terminal of the CPU in response to detection of the system idle by the system idle detecting means, thereby causing the CPU sleep means to execute a process of issuing an instruction to generate the stop clock signal; system event detecting means for monitoring the various hardware interrupt request signals and detecting occurrence of a system event when one of the hardware interrupt request signals is generated; and means for causing the stop clock signal generating means to stop generating the stop clock signal in response to detection of occurrence of a system event by the system event detecting means, thereby returning the CPU to the normal state from the stop grant state, the CPU sleep means including means for permitting the stop clock signal generating means to intermittently generating the stop clock signal so that the CPU alternately repeats the stop grant state and the normal state in a period from generation of the interrupt signal indicating a system idle to detection of occurrence of a system event by the system event detecting means.

In this computer system, the CPU in sleep mode alternately repeats the stop grant state and the normal state for a given period of time. Although any command execution by the CPU is stopped in the stop grant state, a command execution can restart in the normal state. Accordingly, during the sleep mode, i.e., during the period from the detection of a system idle to the detection of the occurrence of a system event, the execution of a program by the CPU is not stopped completely and the CPU can intermittently execute a program. Even if the CPU is set to the sleep mode due to erroneous detection of an idling state while the CPU is executing a program which performs an operation without using I/O devices, such as a benchmark test for memory, therefore, it is possible to prevent the execution of the program from being suddenly stopped, disabling the subsequent process. As the average operational speed of the CPU in sleep mode can be slowed down, the power consumption of the CPU can be reduced sufficiently on average in this sleep control system.

BRIEF DESCRIPTION OF THE DRAWINGS

FIG. 1 is a block diagram showing the structure of a computer system according to one embodiment of the present invention;

FIG. 2 is a diagram for explaining three operational states of a CPU provided in the system of this embodiment;

FIGS. 3A to 3G are diagrams for explaining the operational principle of a system event detector provided in the system of this embodiment;

FIG. 4 is a diagram for explaining a memory map when an SMI is issued to the CPU provided in the system of this embodiment;

FIG. 7 is a diagram for explaining a resleep process when a stop break occurs due to a timer interrupt in the CPU sleep control operation in FIG. 6;

FIGS. 8A and 8B are diagrams for explaining an operation during a period from the point where the CPU has entered the sleep mode to the point where the CPU returns to the normal operation mode in the CPU sleep control operation in FIG. 6;

FIGS. 9A and 9B are diagrams for explaining a resleep process which is executed in response to the occurrence of a stop break caused by a timer interrupt in the CPU sleep control operation in FIG. 6;

FIG. 14 is a flowchart illustrating a sequence of processes that the global standby SMI routine in FIG. 12 executes when a system event occurs;

FIG. 16 is a flowchart illustrating the detailed sequence of processes for the software SMI routine needed to accomplish the CPU sleep control operation in FIG. 10;

FIG. 17 is a detailed circuit diagram of a stop clock controller 129 shown in FIG. 1;

DETAILED DESCRIPTION OF THE PREFERRED EMBODIMENTS

Figure 5:
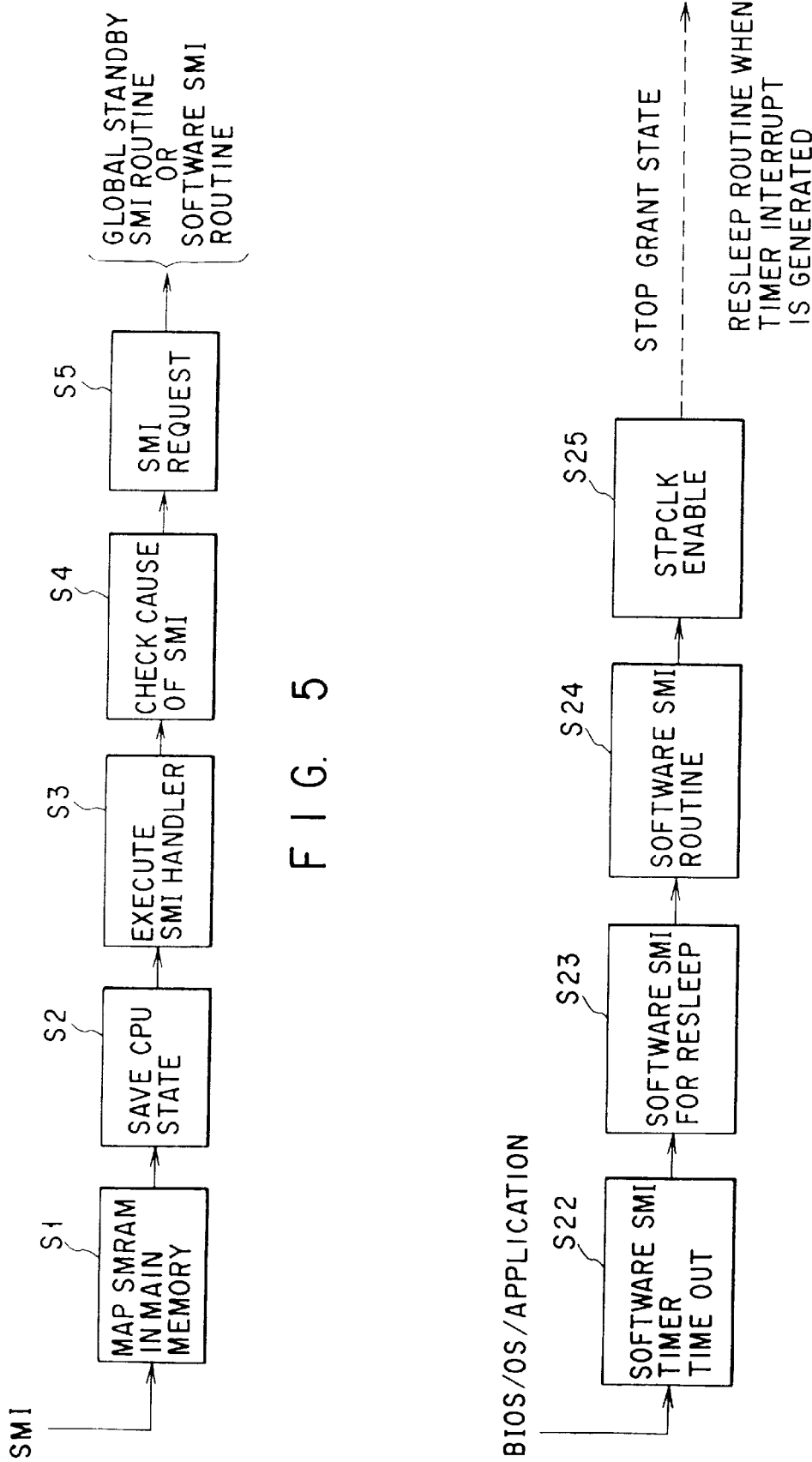
FIG. 5 is a diagram for explaining the operation of the CPU provided in the system of this embodiment when an SMI is issued to the CPU.

Preferred embodiments of the present invention will now be described referring to the accompanying drawings.

FIG. 1 illustrates the structure of a computer system according to one embodiment of the present invention. This computer system is a laptop or a notebook type personal computer system which comprises a CPU 11, a system controller 12, a main memory 13, a BIOS ROM 14 and a bus converter 15.

The CPU 11 and the main memory 13 are connected to a CPU bus 100 including a 32- bit data bus. The CPU bus 100 is connected via the bus converter 15 to a system bus 200 with the ISA specification. The system bus 200 includes a 16- bit data bus.

This system further comprises an interrupt controller 16, a keyboard controller 17, a system timer 18 and other various I/O devices 19, which are all connected to the system bus 200.

The CPU 11 in use is, for example, a microprocessor SL Enhanced Intel486, manufactured and sold by Intel Corporation (United States). The SL Enhanced Intel486 series is classified into four types of clock models: 1x clock model, ½x clock model, ⅓x clock model and 2x clock model. The 1x clock model, ½x clock model and ⅓x clock model are PLL-incorporated models, while the 2x clock model has no PLL. This computer system uses a PLL-incorporated, high-performance SL Enhanced Intel486 of the 1x clock model, ½x clock model or ⅓x clock model.

The following description will be given of the case where an SL Enhanced Intel486 of the 1x clock model is used.

The CPU 11 incorporates a PLL circuit 111, which, based on an external clock CLK, generates an internal clock CLK2 which is the same as or faster than the external clock CLK. This CPU 11 has three operation states of different power consumptions, normal state, stop grant state and stop clock state, as shown in FIG. 2.

The normal state is the normal operation state of the CPU 11, where commands are executed. This normal state consumes the power most: the consumption current is about 700 mA.

The stop clock state uses the lowest power consumption with a consumption current of about 100 to 200 $\mu$A.

The stop grant state comes between the normal state and the stop clock state, and its consumption current is relatively as low as 20 to 50 mA. No commands are executed in this stop grant state. While the external clock CLK and internal clock CLK2 are both running, the supply of the internal clock CLK2 to the internal logic of the CPU 11 is stopped. In the stop grant state, the external clock CLK is stoppable and the stop of the external clock CLK shifts the CPU 11 to the stop clock state from the stop grant state.

The transition between the normal state and the stop grant state can be accomplished quickly by a stop clock (STPCLK) signal.

When the STPCLK signal, which is supplied to the CPU 11 in the normal state, is enabled or set to the active state, the CPU 11 empties all the internal pipelines after completing a command currently under execution, without executing the next command, and executes the stop grant cycle to shift from the normal state to the stop grant state. When the STPCLK signal is disabled or set to the inactive state, the CPU 11 shifts from the stop grant state to the normal state and restarts the execution of the next command.

The transition from the stop grant state to the stop clock state is performed spontaneously by stopping the external clock CLK. When the supply of the external clock CLK to the CPU 11 restarts in the stop clock state, the CPU 11 goes to the stop grant state 1 ms later. The return from the stop clock state to the stop grant state apparently takes time.

It is apparent from the above that the stop grant state is characterized by its very low power as compared with the normal state and its capability to promptly return to the normal state or the command executable state by the STPCLK signal. In this respect, the stop grant state, not the stop clock state, is used as the CPU sleep mode.

The CPU 11 in FIG. 1 further has the following system management function.

The CPU 11 has an operation mode, called a system management mode (SMM), for running a system management program specially designed for the system management or power management in addition to a real mode for running a program such as an application program or OS, a protect mode, and a virtual 86 mode.

In real mode, the memory space of as large as 1 Mbytes can be accessed, and a physical address is determined by an offset value from the base address represented by the content of a segment register. In protect mode, the memory space of as large as 4 Gbytes can be accessed per task, and a linear address is determined by using an address mapping table called a descriptor table. This linear address is finally converted to a physical address by paging. The virtual 86 mode allows a program designed operable in real mode to run in protect mode, and in this virtual 86 mode, a real-mode program is treated as one task in protect mode.

The system management mode (SMM) is a pseudo real mode in which no descriptor table is referred nor no paging is executed. When a system management interrupt (SMI) is issued to the CPU 11, the operation mode of the CPU 11 is switched to the SMM from the real mode, the protect mode or the virtual 86 mode. In the SMM, a system management program specially designed for the system management or power saving control is executed.

The SMI is one kind of a nonmaskable interrupt (NMI), but has the highest priority, higher than the ordinary NMI and a maskable INTR. The generation of this SMI can invoke various SMI service routines, prepared as a system management program, regardless of a currently running program or the OS environments. This computer system utilizes this SMI to control the CPU sleep in order to always accomplish the same sleep mode function irrespective of the OS environments.

The system controller 12 is a gate array for controlling memories and I/O devices in the system, and has hardware for controlling the generation of the SMI signal and the STPCLK signal to the CPU 11.

The main memory 13 stores an OS, an application program to be executed, and user data prepared by the application program. An SMRAM (System Management RAM) 50 is an overlay which is mapped in the address space in the main memory 13 from the address 30000H to 3FFFFH, and is accessible only when the SMI signal is input to the CPU 11. The address range where the SMRAM is mapped is not fixed, but can be changed to any location in the 4-Gbyte space by a register called SMBASE. The SMBASE register can be accessed only in the SMM. The initial value of the SMBASE register is the address 30000H.

When the CPU 11 enters the SMM, the CPU status, i.e., registers or the like in the CPU 11 at the time an SMI has been generated are saved in a stack form in the SMRAM 50. Stored in this SMRAM 50 is a command for calling the system management program. This command is executed first when the CPU 11 enters the SMM, and the execution of the command gives control to the system management program.

The BIOS ROM 14, which holds the BIOS (Basic I/O System), is constituted of a flash memory so that programs are rewritable. The BIOS is designed to operate in real mode. This BIOS includes an IRT routine which is executed at the system booting, device drivers for controlling various I/O devices and the system management program. The system management program, which runs in SMM, includes an SMI program consisting of a global standby SMI routine and a software SMI routine, and an SMI handler for determining the SMI routine to be executed.

The global standby SMI routine and the software SMI routine each include a sleep control routine for setting the CPU 11 to the sleep mode. The global standby SMI routine further includes an auto power-off routine for powering the system on after the system status is saved.

The SMI handler is a program in the BIOS which is called first by the CPU 11 when an SMI is generated, and the SMI handler checks the cause of the SMI and calls the SMI routine associated with that cause.

The bus converter 15 converts the bus width between the 32- bit data bus of the CPU bus 100 and the 16- bit data bus of the system bus 200.

The interrupt controller 16 receives interrupt request signals IRQ0 to IRQ15 from the keyboard controller 17, the system timer 18 and the other I/O devices 19, and controls the generation of an interrupt signal INTR to the CPU 11 in accordance with the priority of those interrupt request signals. In this case, status information indicating a generated interrupt request signals is held in a register in the interrupt controller 16. The interrupt signal INTR is generated when one of the hardware interrupt request signals (IRQ0–IRQ15) is generated.

The IRQ0 is a timer interrupt request signal which is generated, for example, every 55 ms by the system timer 18. The generation interval of the IRQ0 is programmable and may be set shorter than 55 ms for faster task switching depending on the OS environment. The IRQ1 is a keyboard interrupt signal generated by the keyboard controller 17 at the time of a key input. Another interrupt signal from the keyboard controller 17 is the interrupt signal IRQ12 which is generated at the time a mouse is operated. The IRQ2–IRQ11 and IRQ13–IRQ15 are interrupt request signals from other various I/O devices 19 in the system (such as a floppy disk controller, a hard disk controller, a serial port, and a SCSI port).

A description will now be given of the structure of hardware in the system controller 12, which controls the generation of the SMI and STPCLK.

As illustrated, the system controller 12 has I/O registers 121, a global standby timer 122, a software SMI timer 123, a system event detector 124, a global standby SMI generator 127, OR circuits 128 and 130, a stop clock generator 129 and an NMI generator 131.

The I/O registers 121 are readable and writable by the CPU 11. SMI status information indicating the cause of an SMI is set in the I/O registers 121 by the hardware in the controller 12, and a global standby time-out value, a software SMI warning time-out software SMI warning time-out count value, etc. are also set in those registers 121 by the CPU 11. The global standby time-out value is sent to the global standby timer 122, and the software SMI warning time-out count value is sent to the software SMI timer 123. Further, a stop clock command for causing the stop clock generator 129 to generate the STPCLK is set in the I/O registers 121 by the CPU 11.

The global standby timer 122 is an up-counter which operates in the units of, for example, 4 seconds, and starts the counting operation when the global standby time-out value is set in the registers 121. When the system event detector 124 generates a system event detection signal, the count value of the global standby timer 122 is reset and the counting restarts from the count value "0." When the count value coincides with the global standby time-out value, a global standby time-out signal is generated from the global standby timer 122. This global standby time-out signal indicates that a system event has not occurred during the time specified by the global standby time-out value. This global standby time-out signal causes the global standby SMI generator 125 to generate a global standby SMI.

The software SMI timer 123 is an up-counter which operates in the units of, for example, 1 second, and starts the counting operation when the software SMI warning time-out value is set in the registers 121. When the system event detector 124 generates a system event detection signal, the count value of the software SMI timer 123 is reset and the counting restarts from the count value "0." When the count value coincides with the software SMI warning time-out value, a software SMI warning time-out signal is generated from the software SMI timer 123. This software SMI warning time-out signal causes the software SMI generator 126 to generate a software SMI.

The system event detector 124 monitors the hardware interrupt signals and NMI to detect the occurrence of an system event. When detecting the occurrence of a system event, the system event detector 124 generates the system event detection signal.

The "system event" n means hardware interrupt signals excluding the timer interrupt (IRQ0), i.e., IRQ1 to IRQ15 and NMI.

The system event detector 124 does not actually monitor the IRQ1-IRQ15 but monitors the INTR and IRQ0 instead for the purpose of reducing the number of input pins of the system controller 12. In this case, the system event detector 124 determines that any of the IRQ1–IRQ15 has occurred (system event) when the IRQ0 is not in an active state upon the occurrence of the INTR. In this case, even if the IRQ0 is in an active state, it is determined that a system event has occurred when the INTR has been generated twice during one active state period.

When the INTR has been generated twice during the period in which the IRQ0 is kept active (H), as shown in FIG. 3A, the generation of the first INTR is not considered as the occurrence of a system event, but the generation of the second INTR is considered as such. When the IRQ0 returns to an inactive state (L) in a midway, as shown in FIG. 3B, it is not considered as the occurrence of a system event even if the IRQ0 is kept active (H) at the time the INTR occurs twice in row.

As the IRQ0–IRQ15 are edge-trigger signals, only the edge of the transition from the inactive state to the active state is effective and the period during which such a signal is kept at the active state is insignificant.

As shown in FIG. 3C, the IRQ0, once generated, is kept active (H) for a given period of time (about 27 ms). Even after the timer process is terminated, the IRQ0 does not promptly return to the inactive state (L) and remains active (H). During the period where the IRQ0 is kept at the active state (H), therefore, the first INTR generated is originated from the IRQ0 but the second INTR is generated by a cause different from the IRQ0, such as the IRQ1.

From the above, there are two cases where the system event detector 124 detects a system event.

1) When the IRQ0 is not in an active state upon generation of the INTR.

2) Even with the IRQ0 in an active state, when the INTR is generated twice in one active state period of the IRQ0.

When no system event has occurred during the time specified by the global standby time-out value, i.e., when the global standby time-out signal has not been generated during that time, the global standby SMI generator 125 generates a global standby SMI indicating a system idle. The global standby SMI is supplied via the OR circuit 128 to the CPU 11. When the global standby time-out signal is generated, the SMI status information indicating the generation of the global standby SMI is set in the registers 121.

The software SMI generator 126 generates a software SMI in response to the software SMI warning time-out signal from the software SMI timer 123. This software SMI is supplied via the OR circuit 128 to the CPU 11. When the software SMI warning time-out signal is generated, the SMI status information indicating the generation of the software SMI is set in the registers 121.

The SMI generator 127 of other causes generates SMIs due to other causes than the global standby time-out and software SMI warning time-out (an external input SMI, I/O trapping originated SMI, SMI by a local standby time-out and SMI by a suspend resume button signal from the power supply).

The stop clock controller 129 generates a stop clock signal (STPCLK) to set the CPU 11 in the stop grant state, when a stop clock generation command is set in the registers 121. The generation of this STPCLK is stopped when a stop break signal is supplied from the OR circuit 130. The stop break signal is generated to return the CPU 11 to the normal state from the stop grant state. The causes for the stop break signal are all the SMIs and the INTR and NMI, latter two generated by the IRQ0–IRQ15.

The details of the stop clock controller 129 are illustrated in FIG. 17.

In FIG. 17, an I/O decoder 1211 and an AND circuit 1212 are incorporated in the registers 121 shown in FIG. 1. The I/O decoder 1211 decodes an address supplied from the CPU 11 and outputs a coincidence signal to the AND circuit 1212 when detecting a predetermined address. When receiving an I/O read signal IOR#, the AND circuit 1212 outputs a pulse signal to the set terminal (S) of a flip-flop (F/F) 129. Consequently, the F/F 129 outputs the stop clock signal (STPCLK) from a bar Q output terminal (/Q) to the CPU 11.

When any of the SMI signal, NMI signal and the INTR signal, which are causes of the stop break, is output, the OR circuit 130 supplies a pulse signal to the reset terminal (R) of the F/F 129, thus resetting the F/F 129.

The NMI generator 131 generates the NMI in response to a cause for the NMI, such as an I/O channel check. This NMI is supplied to the CPU 11, the system event detector 124 and the OR circuit 130.

In this system controller 12, the system event detector 124 monitors various hardware interrupt request signals in the system and detects a system idle when all the hardware interrupt request signals except the timer interrupt are not generated for a predetermined period of time. Accordingly, the global standby SMI for setting the CPU 11 in the sleep mode is generated.

When the stop clock command is issued from the CPU 11, the stop clock controller 129 generates the STPCLK to set the CPU 11 to the stop grant state. When a cause for the stop break such as a hardware interrupt is generated under the above situation, the stop clock controller 129 stops generating the STPCLK and sets the CPU 11 to the normal state to permit the CPU 11 to execute a process associated with the hardware interrupt.

In this system controller 12, a software SMI for the stop break and a software SMI for the resleeping are alternately generated in such a way that the stop grant state and normal state are alternately repeated at a given time interval. This SMI generation is accomplished by setting the time-out time for the stop break in the software SMI timer 123 before the generation of the STPCLK signal and setting the time-out time for the resleep in the software SMI timer 123 when the stop break occurs due to the stop-break software SMI.

In this case, if, before the generation of a software SMI which causes the stop break, another cause for the stop break occurs by a hardware interrupt request signal, such as a keyboard interrupt, the stop break by this hardware interrupt request signal is enabled without waiting for the time-out time. This can ensure a faster service to the keyboard controller 17 and other I/O devices 19 requesting a service.

When the timer interrupt is a cause for the stop break, the resleep process is executed to set the CPU 11 back to the stop grant state.

A description will now be given of the operation procedures of the CPU sleep control using the SMI and STPCLK.

Referring to FIGS. 4 and 5, the operation of the CPU 11 when an SMI is issued to the CPU 11 will be discussed below.

When an SMI is input to the CPU 11, the CPU 11 maps the SMRAM 50 in the address space in the main memory 13 from the address 30000H to 3FFFFH first (step S1). The addresses 30000H to 3FFFFH of the main memory 13 therefore become inaccessible, but the SMRAM 50 becomes accessible instead.

The SMRAM 50 is provided with a CPU state save area and an SMI handler work area, and a jump code designating the SI handler designating the SMI handler in the BIOS ROM 14 as an interrupt target is set in this SMRAM 50.

Next, the CPU 11 saves the contents of the various registers in the CPU 11 (CPU status) when an SMI is input are saved in a stack form in the CPU state save area in the SMRAM 50 (step S2). The CPU 11 fetches a code at the start address 38000H in the SMM or the jump code set at the address 38000H in the SMRAM 50, and executes the SMI handler of the BIOS ROM 14 designated by the jump code (step S3). The processes at steps S1 to S3 are executed by a microprogram of the CPU 11.

The SMI handler called by the execution of the jump code checks the cause for an SMI to determine what causes the SMI (step S4). In this process, the SMI status information set in the registers 121 in the system controller 12 is referred. For example, if the global standby time-out has caused the SMI, the SMI handler requests the execution of the BIOS SMI service routine associated with that SMI, i.e., the execution of the global standby SMI routine (step S5). If the software SMI warning time-out has caused the SMI, the SMI handler requests the execution of the software SMI routine (step S5). The global standby SMI routine and the software SMI routine both include the CPU sleep control routine.

It is apparent from the above that the CPU sleep control routine can be invoked, without involving the OS or BIOS, simply by supplying the SMI signal to the CPU 11.

Figure 6:
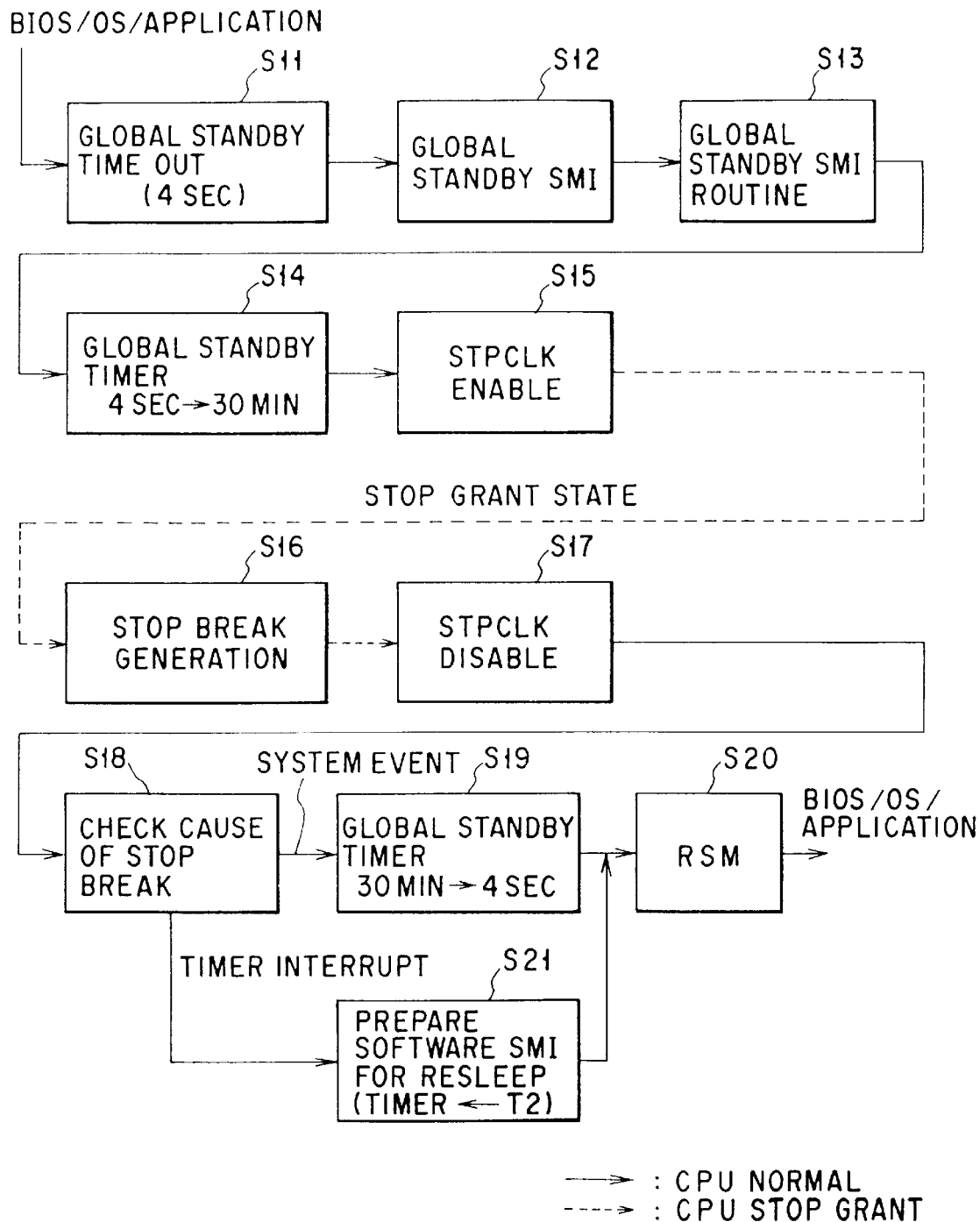
FIG. 6 is a diagram for explaining the first CPU sleep control operation to keep the CPU in a stop grant state during a sleep mode in the system of this embodiment.

Referring to FIGS. 6 and 7, the CPU sleep control operation in the case where the CPU 11 is kept at the stop grant state during the sleep mode will be discussed below.

At the time of the system boot loading, the detection time for detecting a system idle is set as the global standby time-out value in the global standby timer 122. This global standby time-out value is set to a relatively short time, preferably one of 4 seconds, 8 seconds, . . . , one minute (4 seconds in this example) so that the CPU 11 can enter the sleep mode immediately upon occurrence of a system idle. This timer initialization is executed by the IRT routine.

When none of the hardware interrupt request signals except the timer interrupt are generated for 4 seconds after the activation of the system, the global standby timer 122 generates the global standby time-out signal (step S11). In response to this global standby time-out signal, the global standby SMI generator 125 generates the global standby SMI signal (step S12). At this time, the SMI status information indicating the occurrence of an SMI caused by the global standby time-out is set in the registers 121.

The CPU 11 enters the SMM in response to the SMI signal and executes the global standby SMI routine (step S13). The global standby SMI routine resets the global standby time-out value to the time for auto power-off, e.g., 30 minutes (or 1 hour) (step S14), and then sets the stop clock command instructing the generation of the STPCLK in the registers 121.

The stop clock controller 129 generates the STPCLK in response to the stop clock command (step S15). The CPU 11 is set to the sleep mode or the stop grant state in response to the generation of the STPCLK. As a result, the execution of commands by the CPU 11 is inhibited and the execution of the global standby SMI routine is interrupted.

When the cause for the stop break is generated in the sleep mode (step S16), it is sent as the stop break signal to the stop clock controller 129. In response to this stop break signal, the stop clock controller 129 stops the STPCLK (step S17). Consequently, the CPU 11 goes to the normal state from the stop grant state and leaves the sleep mode. Then, the execution of the global standby SMI routine starts from the next command.

The global standby SMI routine first checks the cause of the stop break to find out if the stop break cause is a system event (hardware interrupt request signal other than the timer interrupt) or the timer interrupt (step S18). This check of the stop break cause is accomplished by referring to the interrupt status register or the like in the interrupt controller 16.

When the stop break has been caused by a system event, the global standby SMI routine sets the global standby time-out value back to 4 seconds (step S19) and then executes a resume (RSM) command (step S20). This returns the control to the OS or an application program which has been interrupted by the SMI, so that the CPU 11 returns to the normal operation mode from the sleep mode. Then, a service for the interrupt which caused the system event is executed.

During the SMM, the INTR oriented interrupt (including the IRQ0) is masked by the CLI. So is the NMI.

When the stop break has been caused by the timer interrupt (IRQ0), on the other hand, the global standby SMI routine sets a time T2 in the software SMI timer 123 to generate the resleep software SMI after a given period of time (step S21) and then executes the resume (RSM) command (step S20). This returns the control temporarily to the OS or an application program which has been interrupted by the SMI, and the IRQ0 oriented timer interrupt is processed by the OS or the application program. Immediately after the processing of the timer interrupt, however, the CPU 11 is set back to the sleep mode by the resleep software SMI.

A description will now be given of the procedures of the resleep process when the timer interrupt has occurred to cause the stop break.

When the time T2 set in the software SMI timer 123 at step S21 elapses, the software SMI timer 123 generates the software SMI warning time-out signal (step S22) as shown in FIG. 7. In response to this software SMI warning time-out signal, the software SMI generator 126 generates a software SMI signal for resleep (S23). At this time, the SMI status information indicating the occurrence of the SMI originating from the software SMI warning time-out is set in the registers 121.

The CPU 11 enters the SMM in response to the SMI signal and executes the software SMI routine (step S24). When acknowledging that the SMI is the software SMI for resleep, the software SMI routine sets the stop clock command instructing the generation of the STPCLK in the registers 121. The stop clock controller 129 generates the STPCLK in response to that stop clock command (step S25). In response to the generation of the STPCLK, the CPU 11 is set back to the stop grant state from the sleep mode.

FIG. 8 presents a timing chart during a period from the point where the CPU 11 has entered the sleep mode due to the global standby time-out to the point where the CPU 11 returns to the normal operation mode from the sleep mode due to a system event such as a keyboard interrupt.

In FIG. 8, t1 indicates the generation timing of the global standby time-out which happens when no system event occurs for 4 seconds during the normal operation mode of the CPU 11. At this timing t1, the CPU 11 enters the SMM and control is given to the global standby SMI routine from the program under execution then. The CPU 11 enters the stop grant state at t2 which is the generation timing of the STPCLK. Timing t3 shows the timing at which a system event such as a keyboard interrupt occurs. At this timing t3, the CPU 11 returns to the normal state from the stop grant state. Timing t4 is the timing for executing the RSM command, and the execution of this RSM command gives control back to the interrupted program from the global standby SMI routine. The interrupt process such as the keyboard interrupt is executed by that program.

FIG. 9 presents a timing chart when the resleep process is executed due to the occurrence of the timer-interrupt oriented stop break.

In FIG. 9, t1 indicates the generation timing of the global standby time-out which happens when no system event occurs for 4 seconds during the normal operation mode of the CPU 11. At this timing t1, the CPU 11 enters the SMM and control is given to the global standby SMI routine from the program under execution then. The CPU 11 enters the stop grant state at t2 which is the generation timing of the STPCLK. Timing t3 shows the generation timing of the timer interrupt. At this timing t3, the temporary stop break occurs in the CPU 11 and the CPU 11 returns to the normal state from the stop grant state. t4 is the timing for the preparation to generate the software SMI for resleep after a given period of time, t5 is the timing for executing the RSM command, and the execution of this RSM command gives control back temporarily to the interrupted program from the global standby SMI routine. The timer interrupt process is executed by that program. Timing t6 indicates the generation timing of the software SMI for resleep. At this timing t6, the CPU 11 enters the SMM again and executes the software SMI routine. The CPU 11 enters the stop grant state at t7 which is the generation timing of the STPCLK, t8 shows the timing at which a system event such as the keyboard interrupt occurs. At this timing t8, the CPU 11 returns to the normal state from the stop grant state. The setting for resleep is not conducted this time. t9 is the timing for executing the RSM command. The execution of this RSM command gives control back to the interrupted program from the software SMI routine, and the CPU 11 returns to the normal operation mode from the sleep mode. The keyboard interrupt process is executed in this mode.

In this sleep control system, as described above, when the stop break cause is the occurrence of a system event, the CPU 11 returns from the sleep mode immediately, whereas when the stop break is caused by the timer interrupt, the sleep mode continues by the resleep process.

Besides the aforementioned system event and timer interrupt, an SMI by the global standby time-out for auto power-off may be generated as the stop break cause.

That is, when the sleep mode of the CPU 11 continues for 30 minutes, the SMI by the global standby time-out is generated as the stop break cause.

In this case, after leaving the sleep mode by the processes at steps S19 and S20 in FIG. 5, the CPU 11 executes the global standby SMI routine corresponding to the global standby SMI signal. When confirming that the global standby time-out value set in the registers 121 is 30 minutes, the global standby SMI routine calls the auto power-off routine. The auto power-off routine saves in the main memory 13 the system status necessary to restore the system, upon power on, to the state immediately before the system was powered off, and then powers off nearly all the units in the system except the main memory 13.

As described above, in the sleep control in this computer system, various hardware interrupt request signals IRQ0–IRQ15 and NMI in the system are monitored and a system idle is detected when none of the hardware interrupt request signals except the timer interrupt (IRQ0) are generated for a predetermined period of time, thereby setting the CPU 11 to the sleep mode. Accordingly, the number of triggers to set the CPU 11 to the sleep mode increases and the CPU 11 can enter the sleep mode when an application program waits for the completion of the operation of an I/O device other than the keyboard as well as at the time CPU 11 is idling when the application program stands by for a keyboard input. It is therefore possible to prevent the CPU 11 from being kept in the operational state even when the CPU 11 is idling, thereby sufficiently reducing the power consumption.

The hardware interrupt request signals are used to detect a system idle. The hardware interrupt request signals IRQ0–IRQ15 are physical signals generated from various I/O devices in the system, and the detection of those signals does not involve the BIOS at all. Further, the SMI routine including the sleep sequence can be invoked only by the supply of the SMI signal to the CPU 11, and the activation of this process does not involve the OS and BIOS at all.

It is thus possible to detect a system idle at the hardware level and execute the CPU sleep control, thus always ensuring the same sleep mode function regardless of the OS environments. Even when an application program which directly controls hardware without involving the BIOS is running, it is still possible to detect a system idle and perform the CPU sleep control.

In the sleep mode, the CPU 11 is kept at the stop grant state in which the execution of any command is inhibited so that the consumed power of the CPU 11 can be reduced without stopping the external clock. It is therefore possible to return the CPU 11 from the sleep mode without dynamically switching the external clock, thus ensuring the fast returning of the PLL-incorporated, high-performance CPU 11 from the sleep mode.

A description will now be given of the operation in the case where the stop grant state and normal state are alternately repeated at a given time interval in the sleep mode.

This sleep mode control system slows the operation speed of the CPU 11 in the sleep mode, not to fully stop the CPU 11. The reason for employing this system will be discussed below.

In this system, the CPU 11 is set to the sleep mode in response to a 4-sec global standby time-out and the sleep mode is released by the occurrence of a system event. When the CPU 11 is running a program which performs an operation without using I/O devices, such as a memory benchmark test, therefore, the CPU 11 may be erroneously set to the sleep mode. In this case, if the operation of the CPU 11 is stopped completely, the program which should be executed suddenly stops and no subsequent processing is performed even though the CPU 11 is not waiting for an event. If the user makes a key input or the like to release the sleep mode, the CPU 11 can come out of that state. That is, without any key input, the CPU 11 cannot escape such a state.

To prevent such a situation, it is preferable to operate the CPU 11 at a low speed in the sleep mode, rather than to completely stop the CPU 11.

In this system, the operation speed of the CPU 11 in the sleep mode is slowed by the duty control at the stop grant state and the normal state as will be discussed shortly.

Figure 10:
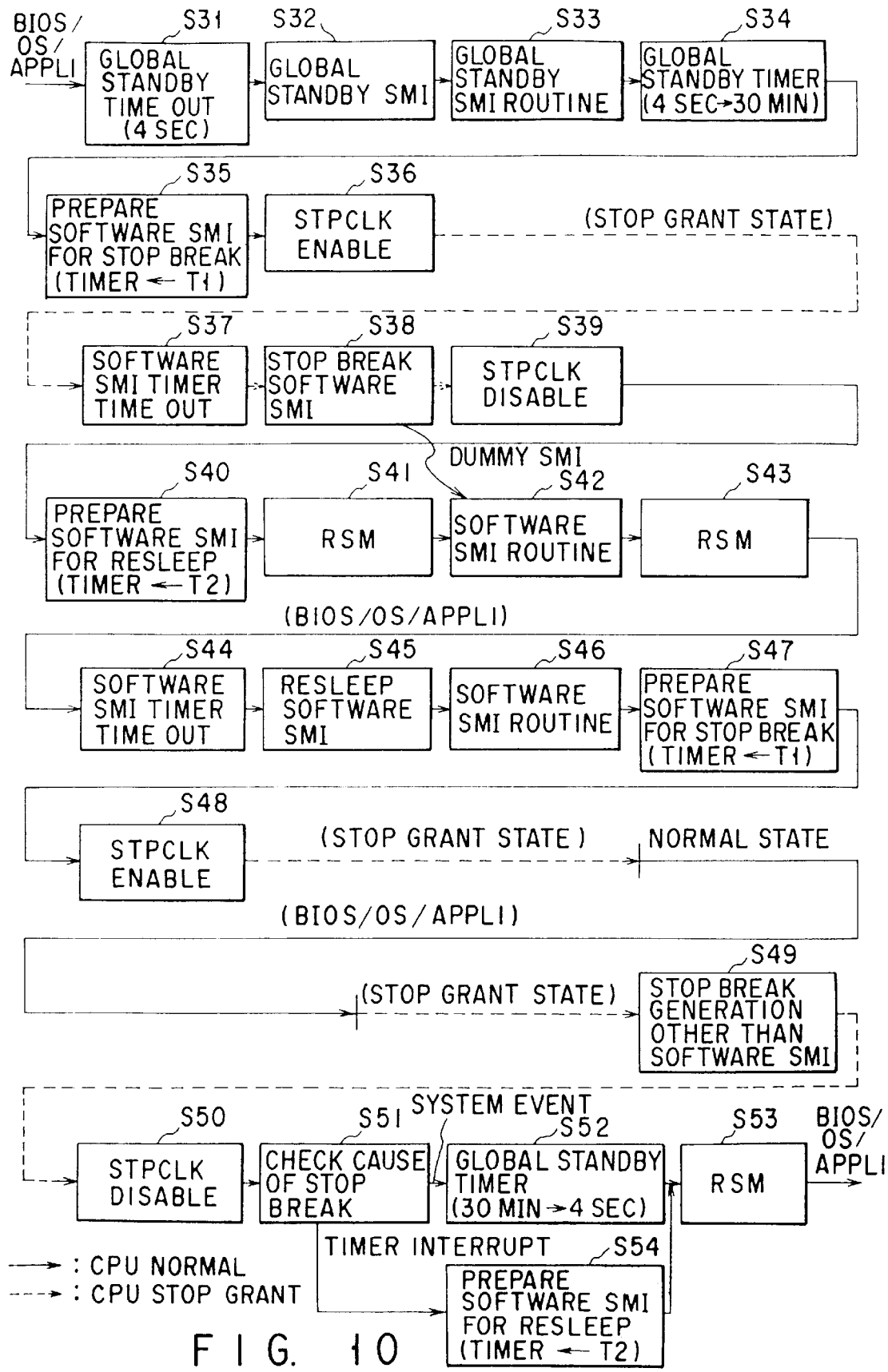
FIG. 10 is a diagram for explaining the first CPU sleep control operation to alternately switch the CPU between the stop grant state and the normal state during the sleep mode in the system of this embodiment.

When none of the hardware interrupt request signals except the timer interrupt are generated for 4 seconds after the activation of the system, the global standby timer 122 generates the global standby time-out signal (step S31), as shown in FIG. 10. In response to this global standby time-out signal, the global standby SMI generator 125 generates the global standby SMI signal (step S32). At this time, the SMI status information indicating the occurrence of an SMI caused by the global standby time-out is set in the registers 121.

The CPU 11 enters the SMM in response to the SMI signal and executes the global standby SKI routine (step S33). The global standby SMI routine resets the global standby time-out value to the time for auto power-off, e.g., 30 minutes (step S34), and then sets a time T1 (e.g., 2 ms) in the software SMI timer 123 to generate the software SMI for the stop break after a predetermined period of time (step S35). Then, the global standby SMI routine sets the stop clock command instructing the generation of the STPCLK in the registers 121.

The stop clock controller 129 generates the STPCLK in response to the stop clock command (step S36). The CPU 11 is set to the sleep mode or the stop grant state in response to the generation of the STPCLK. As a result, the execution of commands by the CPU 11 is inhibited and the execution of the global standby SMI routine is interrupted.

When the time T1 elapses after the mode transition of the CPU 11 to the sleep mode, the software SKI timer 123 generates the software SMI warning time-out signal for the stop break (step S37). In response to this software SKI warning time-out signal, the software SMI generator 126 generates the software SMI for the stop break (step S38). This software SMI is sent as the stop break signal to the CPU 11 as well as to the stop clock controller 129.

The stop clock controller 129 stops generating the STPCLK (step S39). As a result, the CPU 11 enters the normal state from the stop grant state and starts executing the global standby SMI routine from the next command.

The global standby SMI routine first sets the time T2 (e.g., 1 ms) in the software SMI timer 123 to generate the software SMI for resleep after a given period of time (step S40), and then executes the resume (RSM) command (step S41). Consequently, the control is returned to the OS or application program which has been interrupted by the SMI.

Thereafter, the CPU 11 enters the SMM to perform the process associated with the software SMI generated at step S38 and executes the software SMI routine (step S42). Since the software SMI generated at step S38 is a dummy SMI to cause the stop break, however, the software SMI routine called by this SMI performs no processing other than the execution of the RSM command and returns the control to the OS or application program which has been interrupted by the dummy SMI (step S43).

When the time T2 elapses after the state transition of the CPU 11 to the normal state, the software SMI timer 123 generates the software SMI warning time-out signal (step S44). In response to this software SMI warning time-out signal, the software SMI generator 126 generates the software SMI for resleep (step S45). At this time, the SMI status information indicating the generation of the SMI due to the software SMI warning time-out is set in the registers 121.

The CPU 11 enters the SMM in response to the SMI signal and executes the software SMI routine (step S46). After confirming that the software SMI is for the stop break, the software SMI routine sets the time T1 in the software SMI timer 123 to generate the software SMI for the stop break again after a given period of time (step S47). Thereafter, the software SMI routine sets the stop clock command instructing the generation of the STPCLK in the registers 121.

The stop clock controller 129 generates the STPCLK in response to the stop clock command (step S48). In response to the generation of the STPCLK, the CPU 11 is set to the sleep mode or the stop grant state. As a result, the execution of commands by the CPU 11 is inhibited and the execution of the software SMI routine is interrupted.

In this manner, the stop grant state and the normal state are alternately repeated in the sleep mode.

When a stop break occurs at, for example, the stop grant state due to a cause other than the software SMI, the following process is carried out.

When a stop break occurs due to a cause other than the software SMI (step S49), it is sent as the stop break signal to the stop clock controller 129. In response to this stop break signal, the stop clock controller 129 stops the STPCLK (step S50). Consequently, the CPU 11 goes to the normal state from the stop grant state. Then, the execution of the software SMI routine starts from the next command.

The software SMI routine first checks the cause of the stop break to find out if the stop break cause is a system event (hardware interrupt request signal other than the timer interrupt) or the timer interrupt (step S51). This check of the stop break cause is accomplished by referring to the interrupt status register or the like in the interrupt controller 16.

When the stop break has been caused by a system event, the software SMI routine sets the global standby time-out value back to 4 seconds (step S52) and then executes a resume (RSM) command (step S53). This returns the control to the OS or an application program which has been interrupted by the SMI, so that the CPU 11 returns to the normal operation mode from the sleep mode. Then, a service for the interrupt which caused the system event is executed.

When the stop break has been caused by the timer interrupt (IRQ0), on the other hand, the software SMI routine sets the time T2 in the software SMI timer 123 to generate the resleep software SMI after a given period of time (step S54) and then executes the resume (RSM) command (step S53). While the control is temporarily returned to the OS or an application program which has been interrupted by the SMI, the CPU 11 is immediately shifted to the stop grant state by the software SMI for resleep. As a result, the sleep mode continues.

Figure 11:
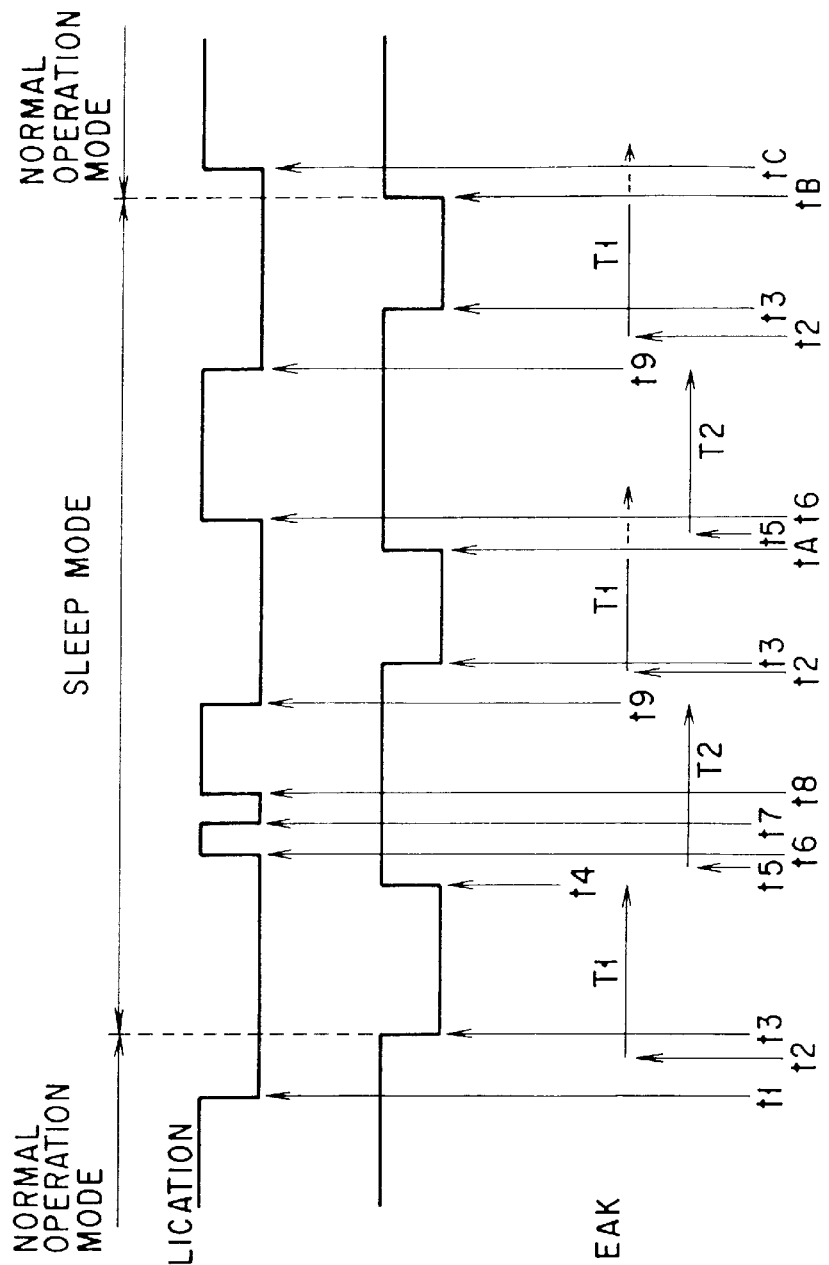
FIGS. 11A to 11C are diagrams for explaining an operation during a period from the point where the CPU has entered the sleep mode to the point where the CPU returns to the normal operation mode in the CPU sleep control operation in FIG. 10.

FIG. 11 presents a timing chart during a period from the point where the CPU 11 has entered the sleep mode in which the stop grant state and the normal state are alternately repeated to the point where the CPU 11 returns to the normal operation mode from the sleep mode due to a system event such as a keyboard interrupt.

In FIG. 11, t1 indicates the generation timing of the global standby time-out which happens when no system event occurs for 4 seconds during the normal operation mode of the CPU 11. At this timing t1, the CPU 11 enters the SMM and control is given to the global standby SMI routine from the program under execution then. t2 indicates the timing for the execution of the preparation process to generate the software SMI for the stop break after a given period of time. The CPU 11 enters the stop grant state at t3 which is the generation timing of the STPCLK. Timing t4 shows the timing at which the software SMI for the stop break is generated. The software SMI generated at timing t4 causes the stop break and the CPU 11 returns to the normal state from the stop grant state. t5 shows the timing for the execution of the preparation process to generate the software SMI for resleep after a given period of time. Timing t6 is the timing for executing the RSM command, and the execution of this RSM command gives control back to the interrupted program from the global standby SMI routine. t7 is the timing at which the flows proceeds to the SMM process associated with the software SMI (dummy SMI) for stop break generated at timing t4. t8 is the timing for executing the RSM command in the SMM process associated with the dummy SMI, and the execution of this RSM command gives at timing t8, control is returned again to the interrupted program. t9 indicates the generation timing of the software SMI for resleep. At this timing t9, the CPU 11 enters the SMM again and executes the software SMI routine.

tA indicates the timing at which a timer interrupt is generated. At this timing tA, temporary stop break occurs on the CPU 11 and the CPU 11 returns to the normal state from the stop grant state. tB indicates the generation timing for a system event such as a keyboard interrupt. At this timing tB, the CPU 11 returns to the normal state from the stop grant state. tC is the timing for executing the RSM command. The execution of this RSM command gives control back to the interrupted program from the software SMI routine, and allows the CPU 11 to return to the normal operation mode from the sleep mode.

In this sleep control system, as described above, the CPU 11 alternately repeats the stop grant state and the normal state at a given time interval in the sleep mode. Although the execution of any command by the CPU 11 at the stop grant state is inhibited, the execution of commands can restart at the normal state. During the sleep mode or during the period from the point of the detection of the occurrence of a system idle to the point of the detection of the occurrence of a system event, therefore, the execution of a program by the CPU 11 is not stopped completely but the CPU can intermittently run a program. Even if the CPU 11 enters the sleep mode by mistake due to the erroneous detection of a system idle, it is possible to prevent the sudden inhibition of the execution of a program which does not wait for an I/O device, such as a benchmark test. As this system can also slow down the average operation speed of the CPU 11 in the sleep mode, the power consumption of the CPU 11 can be reduced sufficiently on average.

When a stop break by a hardware interrupt request signal such as a keyboard interrupt occurs before the generation of a software SMI as the cause for a stop break, the stop break originating from the hardware interrupt request signal occurs. It is therefore possible to quickly provide a service to the keyboard controller 17 or other I/O devices 19 requesting the service.

The sequences of processes of the global standby SMI routine and the software SMI routine in a specific case will be described with reference to FIGS. 12 through 14.

Figure 12:
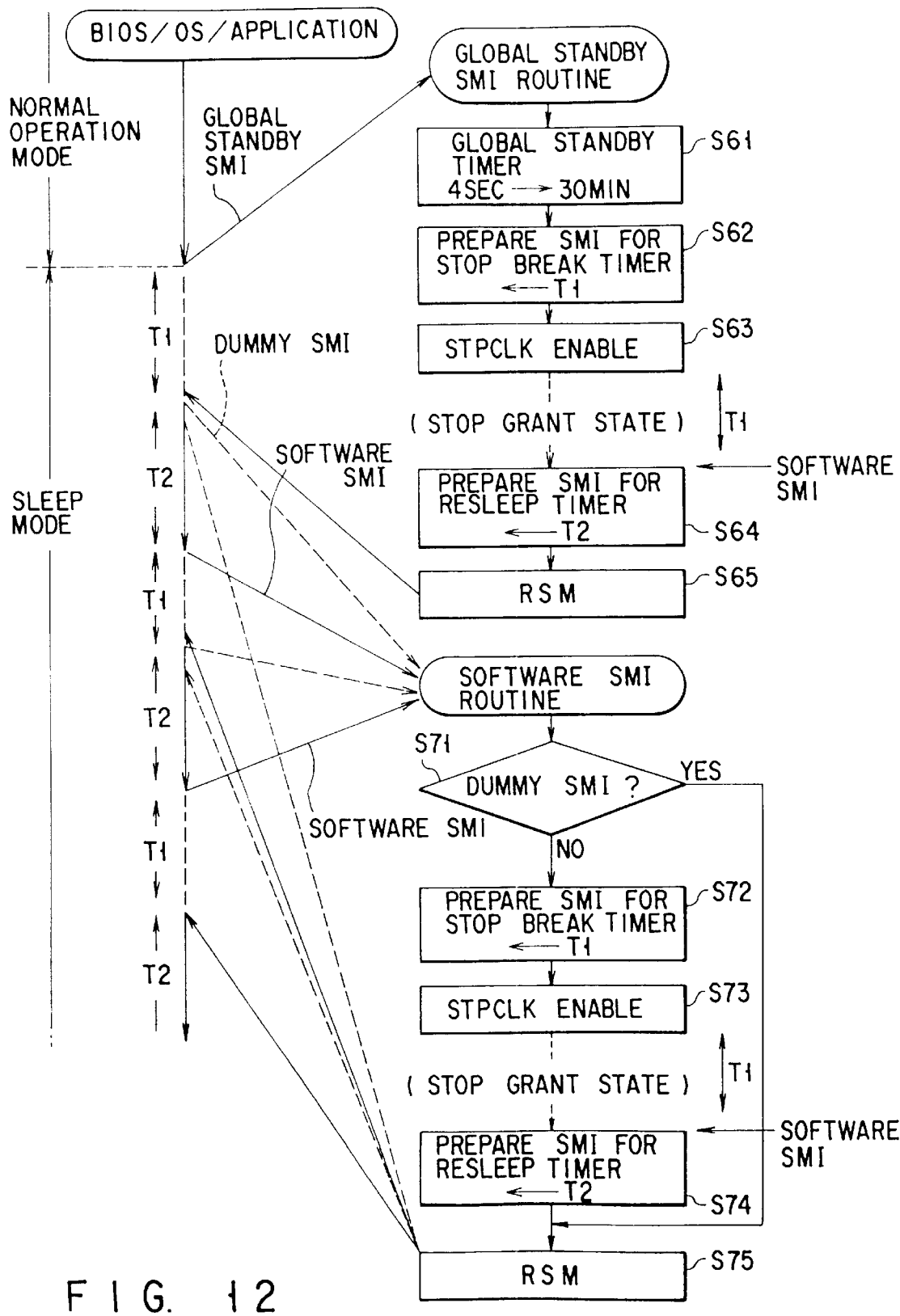
FIG. 12 is a flowchart illustrating sequences of processes for a global standby SMI routine and a software SMI routine needed to accomplish the CPU sleep control operation in FIG. 10.

FIG. 12 presents a flowchart illustrating sequences of processes for the global standby SMI routine and software SMI routine in the case where the stop grant state and normal state are alternately repeated at a given time interval.

When none of the hardware interrupt request signals except the timer interrupt are generated for 4 seconds, the global standby time-out signal is generated and the global standby SMI routine is executed. The global standby SMI routine first resets the global standby time-out value to the time for auto power-off, e.g., 30 minutes (step S61), and then sets the time T1 in the software SMI timer 123 to generate the software SMI for stop break after a predetermined period of time (step S62). Then, the global standby SMI routine instructs the system controller 12 to generate the STPCLK (step S63).

Consequently, the CPU 11 is set to the stop grant state after the generation of the STPCLK until the time T1 elapses from the point of that generation. The global standby SMI routine is interrupted when the execution of step S63 is completed.

When the time T1 elapses after the mode transition of the CPU 11 to the sleep mode, the software SMI signal for stop break is generated. Accordingly, the CPU 11 enters the normal state from the stop grant state and starts executing the global standby SMI routine from the next command.

The global standby SMI routine first sets the time T2 in the software SMI timer 123 to generate the software SMI for resleep after a given period of time (step S64), and then executes the resume (RSM) command (step S65). Consequently, the control is returned to the OS or application program which has been interrupted by the SMI.

Thereafter, the CPU 11 enters the SMM to perform the process associated with the software SMI for stop break and executes the software SMI routine.

When the software SMI routine acknowledges that the software SMI generated in the sleep mode is a dummy SMI, the software SMI routine performs no processing other than the execution of the RSM command and promptly returns the control to the OS or application program which has been interrupted by the dummy SMI (steps S71 and S75).

When the time T2 elapses after the state transition of the CPU 11 to the normal state, the software SMI signal for resleep is generated and the CPU 11 executes the software SMI routine. After confirming that the software SMI is for the stop break (step S71), the software SMI routine sets the time T1 in the software SMI timer 123 to generate the software SMI for stop break again after a given period of time (step S72). Thereafter, the software SMI routine instructs the system controller 12 to generate the STPCLK (step S73).

As a result, the CPU 11 is set to the stop grant state after the generation of the STPCLK until the time T1 elapses from the point of that generation. The software SMI routine is interrupted when the execution of step S73 is completed.

When the time T1 elapses after the mode transition of the CPU 11 to the sleep mode, the software SMI signal for stop break is generated. Accordingly, the CPU 11 enters the normal state from the stop grant state and starts executing the software SMI routine from the next command.

The software SMI routine first sets the time T2 in the software SMI timer 123 to generate the software SMI for resleep after a given period of time (step S74), and then executes the resume (RSM) command (step S75). Consequently, the control is returned to the OS or application program which has been interrupted by the SMI.

Thereafter, the CPU 11 enters the SMM to perform the process associated with the software SMI for stop break and executes the software SMI routine.

When the software SMI routine acknowledges that the software SMI generated in the sleep mode is a dummy SMI, the software SMI routine performs no processing other than the execution of the RSM command and promptly returns the control to the OS or application program which has been interrupted by the dummy SMI (steps S71 and S75).

As the software SMI routine is repeatedly executed in the above manner, the sleep mode continues.

Figure 13:
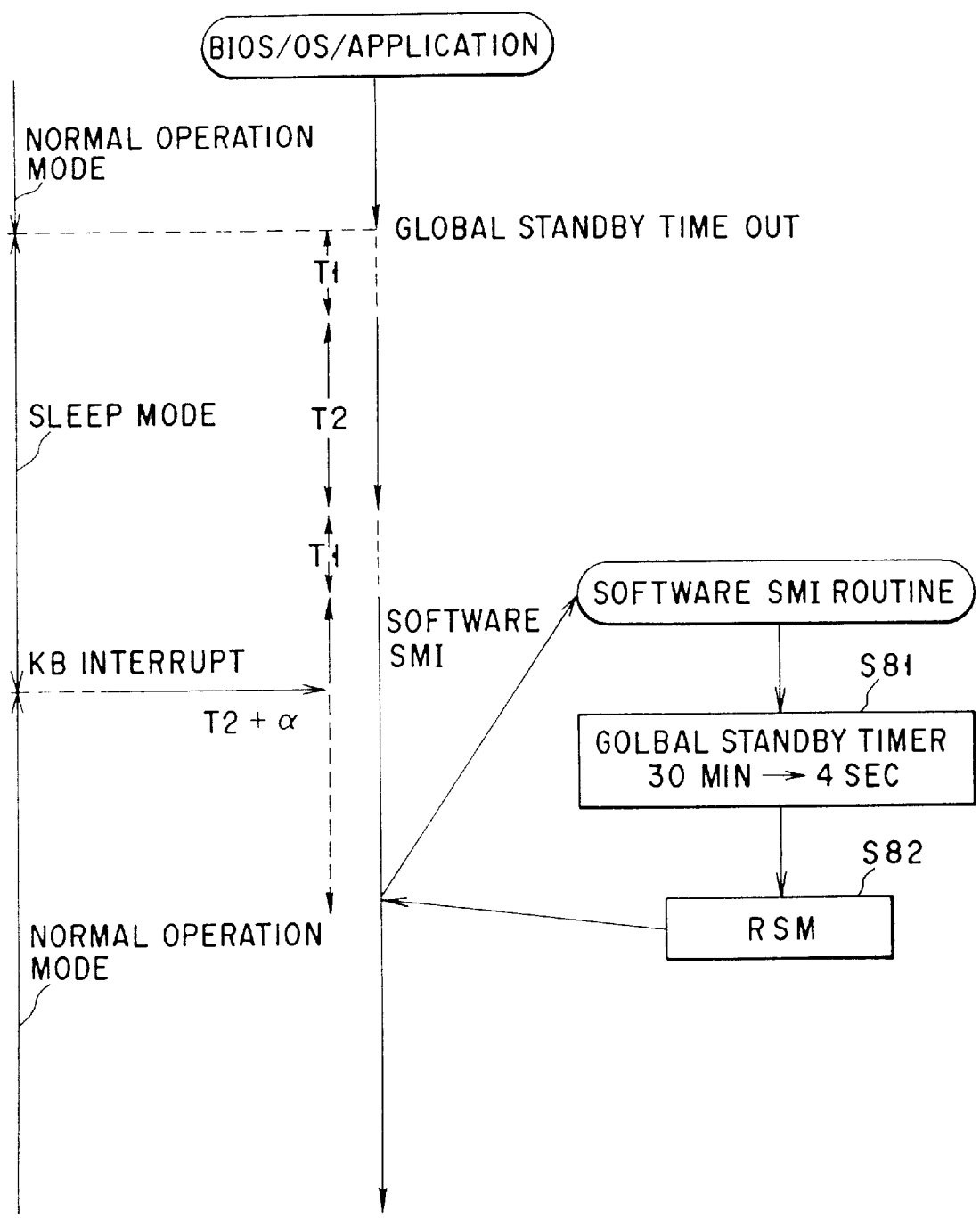
FIG. 13 is a flowchart illustrating a sequence of processes that the software SMI routine in FIG. 12 executes when a system event occurs.

FIG. 13 illustrates the sequence of processes that the software SMI routine executes when a system event occurs before the generation of the software SMI for resleep while the CPU 11 is set at the normal state in the sleep mode.

When a keyboard interrupt is generated before the time T2 passes after the return of the CPU 11 to the normal state, the count value of the software SMI timer 123 is temporarily reset by the system event detection signal. In this case, therefore, the software SMI is generated when the time (T2+α), the sum of the time a from the return of the CPU 11 to the normal state to the generation of a keyboard interrupt and the time T2, elapses.

When the software SMI routine confirms that the software SMI has originated from a system event from the fact that the software SMI had been generated after a time longer than the time T2 passed, the software SMI routine sets the global standby time-out value back to 4 seconds (step S81) without carrying out the setting of the software SMI timer for resleep, and then executes the resume (RSM) command (step S82).

FIG. 14 illustrates the sequence of processes that the global standby SMI routine executes when a system event, such as a keyboard interrupt, occurs before the time T1 passes after the state transition of the CPU 11 to the stop grant state due to the global standby time-out.

As mentioned above, when none of the hardware interrupt request signals except the timer interrupt are generated for 4 seconds, the global standby timeout signal is generated and the global standby SMI routine is executed. The global standby SMI routine first resets the global standby time-out value to the time for auto power-off, e.g., 30 minutes (step S91), and then sets the time T1 in the software SMI timer 123 to generate the software SMI for stop break after a predetermined period of time (step S92). Then, the global standby SMI routine instructs the system controller 12 to generate the STPCLK (step S93).

Consequently, the CPU 11 is set to the stop grant state after the generation of the STPCLK until the time T1 elapses from the point of that generation. The global standby SMI routine is interrupted when the execution of step S93 is completed.

When a keyboard interrupt is generated before the time T1 elapses (T1−β in this case) after the mode transition of the CPU 11 to the sleep mode under this situation, the interrupt causes a stop break, shifting the CPU 11 to the normal state from the stop grant state. The execution of the global standby SMI routine then starts from the next command.

When the global standby SMI routine confirms that the stop break has originated from a system event from the fact that the stop break had occurred before the time T1 has passed after the transition to the sleep mode, the global standby SMI routine sets the global standby time-out value back to 4 seconds (step S94), and then executes the resume (RSM) command (step S95).

Figure 15:
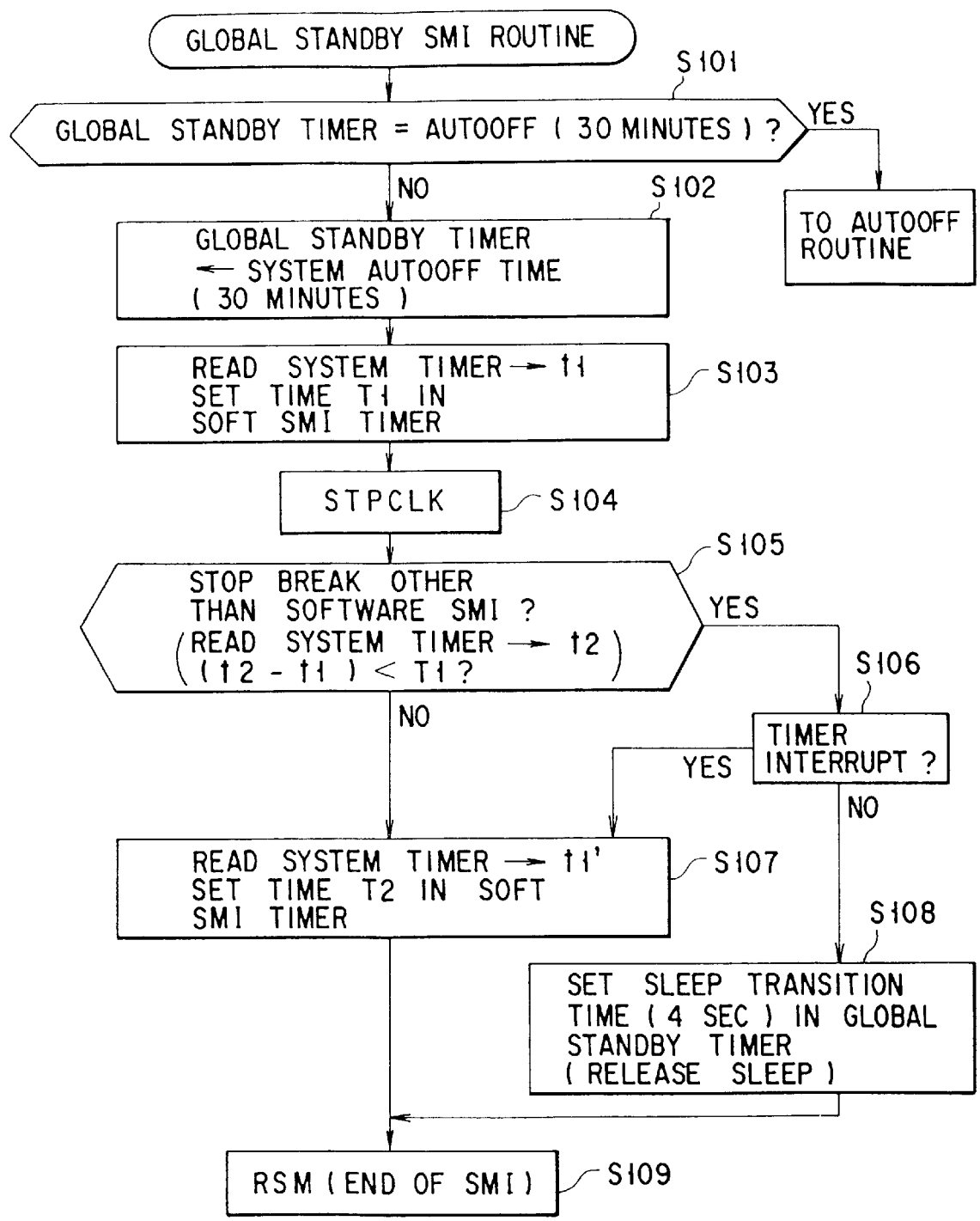
FIG. 15 is a flowchart illustrating the detailed sequence of processes for the global standby SMI routine needed to accomplish the CPU sleep control operation in FIG. 10.

Referring now to FIG. 15, the actual flowchart for the sleep control routine provided in the global standby SMI routine will be described.

The global standby SMI routine, when its execution is requested, first checks whether the global standby time-out value set in the registers 121 is the value for sleep (4 seconds) or the value for auto off (30 minutes) (step S101). When the set value is for auto off (30 minutes), the global standby SMI routine calls the auto-off routine to power off the system.

When the set value is for sleep (4 seconds), the global standby SMI routine first alters the global standby time-out value and sets the value for auto off (30 minutes) in the global standby timer 122 (step S102). Next, the global standby SMI routine reads the time (t1) specified then by the counter incorporated in the system timer 18, and sets the time T1 in the software SMI timer 123 to generate the software SMI for stop break after a given period of time (step S103). Then, the global standby SMI routine sets the stop clock command instructing the generation of the STPCLK in the registers 121 (step S104).

Then, the global standby SMI routine reads the time (t2) specified then by the built-in counter in the system timer 18, checks if t2−t1<T1 is satisfied, and determines from the check result whether the cause for the stop break is other than the software SMI for stop break (step S105).

If the equation, t2−t1<T1, is unsatisfactory, it means that the stop break has not occurred before the passing of the time T1, i.e., that the cause for the stop break is the software SMI for stop break. If the equation, t2−t1<T1, is met, on the other hand, it means that the stop break has occurred within the time T1, i.e., that the cause for the stop break is other than the software SMI for stop break.

When the cause for the stop break is other than the software SMI for stop break, the global standby SMI routine checks if the cause is a timer interrupt (step S106). This checking on the cause for the stop break can be accomplished by, for example, referring to the associated register in the interrupt controller 16.

When the cause for the stop break is not a timer interrupt, the global standby SMI routine determines that a system event has occurred or any of the IRQ1–IRQ15 or the NMI has been generated, sets the global standby time-out value back to 4 seconds (step S108) and then executes the resume (RSM) command (step S109).

When the cause for the stop break is a timer interrupt, on the other hand, the global standby SMI routine reads the time (t1') specified then by the built-in counter in the system timer 18, sets the time in a predetermined register, and sets the time T2 in the software SMI timer 123 to generate the software SMI for resleep after a given period of time (step S107). Then, the global standby SMI routine executes the resume (RSM) command (step S109). At step S107, the SMI routine also performs the setting of a flag indicating the generation of the software SMI (dummy SMI) for stop break in the associated register in the memory 13 or the system controller 12.

Referring now to FIG. 16, the actual flowchart for the sleep control routine provided in the software SMI routine will be described.

When the software SMI signal is supplied to the CPU 11, requesting the execution of the software SMI routine, the software SMI routine determines if the software SMI signal is a dummy SMI signal, based on whether the SMI signal has been generated in the SMI routine (step S201). This determination can be accomplished by referring to the associated flag in the associated register in the memory 13 or the system controller 12 at step S201.

Then, the software SMI routine reads the time (t2') specified then by the built-in counter in the system timer 18, checks if t2'−t1'<T2 is satisfied, and determines from the check result whether the generated SMI signal is a software SMI originating from the occurrence of a system event (step S202).

If the equation, t240 −t1'<T2, is met, it means that the generated SMI signal is originating from the occurrence of a system event. If the equation, t2'−t1'<T2, is not met, on the other hand, it means that the generated SMI signal is the software SMI for resleep.

When the generated SMI signal is originating from the occurrence of a system event, the software SMI routine sets the global standby time-out value back to 4 seconds (step S208) and then executes the resume (RSM) command (step S209).

When the generated SMI signal is originating from the software SMI for resleep, the software SMI routine first reads the time (t1) specified then by the built-in counter in the system timer 18, and sets the time T1 in the software SMI timer 123 to generate the software SMI for stop break after a given period of time (step S203). Then, the software SMI routine sets the stop clock command instructing the generation of the STPCLK in the registers 121 (step S204).

Then, the software SMI routine reads the time (t2) specified then by the built-in counter in the system timer 18, checks if t2−t1<T1 is satisfied, and determines from the check result whether the cause for the stop break is other than the software SMI for stop break (step S205).

If the equation, t2−t1<T1, is unsatisfactory, it means that the stop break has not occurred before the passing of the time T1, i.e., that the cause for the stop break is the software SMI for stop break. If the equation, t2−t1<T1, is met, on the other hand, it means that the stop break has occurred within the time T1, i.e., that the cause for the stop break is other than the software SMI for stop break.

When the cause for the stop break is other than the software SMI for stop break, the software SMI routine checks if the cause is a timer interrupt (step S206). This checking on the cause for the stop break can be accomplished by, for example, referring to the associated register in the interrupt controller 16.

When the cause for the stop break is not a timer interrupt, the software SMI routine determines that a system event has occurred or any of the IRQ1–IRQ15 or the NMI has been generated, sets the global standby time-out value back to 4 seconds (step S208) and then executes the resume (RSM) command (step S209).

When the cause for the stop break is a timer interrupt, on the other hand, the software SMI routine reads the time (t1') specified then by the built-in counter in the system timer 18, sets the time in a predetermined register, and sets the time T2 in the software SMI timer 123 to generate the software SMI for resleep after a given period of time (step S207). Then, the software SMI routine executes the resume (RSM) command (step S209). At step S207, the software SMI routine also performs the setting of the aforementioned flag indicating the generation of the dummy SMI.

According to this embodiment, as described above, even if the CPU 11 is erroneously set to the sleep mode during the execution of, for example, a memory benchmark test by repeating the alternate switching between the stop grant state and the normal state in the sleep mode, it is possible to prevent the sudden inhibition of that program, disabling the execution of the subsequent processing.

Although the cause for the generation of a system event or stop break event is checked by measuring the time in the system timer 18 in this embodiment, if an exclusive timer is provided in the system controller 12 or the system controller 12 is designed to be able to hold information indicating the occurrence of a system event in an associated register, the causes for the system event and stop break event can be checked without using the system timer 18.

According to this embodiment, the system management program including the SMI handler, the software SMI routine and the global standby SMI routine is stored in the BIOS ROM 14 and the SMI handler in the BIOS ROM 14 is called by a jump code at the address 38000H in the SMRAM 50. Since it is important in this invention that the system management program is called by the code at the address 38000H which the CPU 11 fetches first, however, it is possible to store the SMI handler in an area in the SMRAM 50 that starts from the address 38000H, so that the software SMI routine and the global standby SMI routine in the BIOS ROM 14 are called by this SMI handler. Further, the entire system management program including the software SMI routine and the global standby SMI routine may of course be stored in the SMRAM 50.

Furthermore, the address 38000H may be changed to another value by using the aforementioned SMBASE register.

We claim:

1. A computer system, comprising:

an external clock generator for generating an external clock signal having a first clock speed;

a central processing unit (CPU) for receiving the external clock signal and comprising an internal clock generator for generating an internal clock signal having a second clock speed based on the external clock signal, the second clock speed being the same as or faster than the first clock speed;

a timer for producing a time-out signal in accordance with a timing value in order to control power saving of the CPU;

first means for setting the timer with a first timing value and for switching the CPU from a normal state in which the external and the internal clock signals are running and commands are executable to a stop grant state in which the external and the internal clock signals are running, supply of the internal clock signal to internal logics of the CPU is stopped, and no command is executable in response to a first-time out signal from the timer; and second means for setting the timer with a second timing value and for switching the CPU from the stop grant state to the normal state in response to a second time-out signal from the timer, thereby the first means and the second means repetitively and intermittently switching the CPU between the normal state and the stop grant state.

2. The system according to claim 1, further comprising a second timer for causing the CPU to save power in response to a time-out signal of the second timer.

3. The system according to claim 2, wherein the second timer is a global standby timer in which a third timing value is set for switching the CPU from a normal mode to control power saving of the CPU, and for producing a global standby time out signal.

4. The system according to claim 2, further comprising:

first determining means for, when a stop break is caused which causes the second means to switch the CPU from the stop grant state to the normal state, determining a cause of the stop break;

second determining means for, if the first determining means determines that the cause of the stop break is due to the stop break other than the software SMI, determining whether or not the stop break is due to a system timer interrupt; and means for setting the second timer with a third timing value for switching the CPU from the normal mode to control power saving of the CPU, if the second determining means determines that the cause of the stop break is not due to the system timer interrupt.

5. The system according to claim 1, wherein the timer is a software system management interrupt (SMI) timer in which the first timing value and the second timing value are alternatively set for switching the CPU between the normal state and the stop grant state, and for producing a software SMI timer time out signal.

6. The system according to claim 1, further comprising:

means for, when a stop break is caused which causes the second means to switch the CPU from the stop grant state to the normal state, determining a cause of the stop break; and means for setting the timer with the first timing value for causing the first means to switch the CPU from the normal state to the stop grant state if the determining means determines that the cause of the stop break is due to the timer time out signal.

7. The system according to claim 1, further comprising:

first determining means for, when a stop break is caused which causes the second means to switch the CPU from the stop grant state to the normal state, determining a cause of the stop break;

second determining means for, if the first determining means determines that the cause of the stop break is due to the stop break other than the time-out signal of the timer, determining whether or not the stop break is due to a system timer interrupt; and means for setting the timer with the first timing value for causing the first means to switch the CPU from the normal state to the stop grant state if the second determining means determines that the stop break is due to the system timer interrupt.

8. The system according to claim 7, wherein the second determining means determines that the cause of the stop break is due to a system event if the cause of the stop break is not due to the system timer interrupt.

9. The system according to claim 1, wherein the stop grant state is a state in which an internal clock of the CPU is stopped.

10. A computer system comprising:

a CPU coupled to receive a periodic signal from a source external to the CPU that sets the CPU in a stop grant state in which an external clock and an internal clock are running and supply of the internal clock of the CPU to internal logics of the CPU is stopped and no command is executed; and means for periodically asserting the periodic signal to set the CPU in the stop-grant state and changing a duty ratio of the periodic signal, thereby decreasing power consumption of the CPU.

11. The computer system according to claim 10, further comprising a programmable time-out counter for producing a first time-out signal which causes the CPU to transition from a normal state in which the external clock and the internal clock are running and commands are executable to the stop grant state and a second time-out signal which causes the CPU to transition from the stop grant state to the normal state.

12. The system according to claim 11, further comprising:

determining means for, when a stop break is caused which causes the CPU to transition from the stop grant state to the normal state, determining a cause of the stop break; and means for setting the CPU to a normal mode to execute an interrupt process if the determining means determines that the cause of the stop break is an interrupt due to a system event.

13. The system according to claim 12, further comprising means for executing a process of a system timer interrupt if the determining means determines that cause of the stop break is due to a system timer interrupt.

14. A computer comprising:

a circuit device coupled to receive a signal from a source external to the circuit device that stops a supply of an internal clock of the circuit device to internal circuits of the circuit device, wherein the circuit device enters a low power state when it receives the signal;

means for asserting the signal to set the circuit device in the low power state; and means for controlling an operational duty ratio of the circuit device by setting a time period for asserting the signal, wherein the circuit device has operational states including a normal state in which an instruction is executed, and a stop grant state in which a supply of the internal clock to the internal circuits is stopped and an instruction is not executed, the device transitions from the normal state to the stop grant state in response to the generation of a clock stop signal and transitions from the stop grant state to the normal state in response to stopping the generation of the clock stop signal, and the control means intermittently supplies the clock stop signal to the circuit device to set the circuit device to the stop grant state, and causes the circuit device to alternate between the normal state and the stop grant state at predetermined time intervals, to thereby cause the circuit device to alternate between the normal state and the stop grant state at the predetermined time intervals.

15. The computer system according to claim 14, further comprising a programmable time-out counter for producing a first time-out signal which causes the CPU to transition from a normal state to a stop grant state and a second time-out signal which causes the CPU to transition from the stop grant state to the normal state.

16. The system according to claim 14, further comprising:

determining means for, when a stop break is caused which causes the second means to switch the CPU from the stop grant state to the normal state, determining the cause of the stop break; and means for setting the CPU to a normal mode to execute an interrupt process if the determining means determines that the cause of the stop break is an interrupt due to a system event.

17. The system according to claim 16, further comprising means for executing a process of a system timer interrupt if the determining means determines that the cause of the stop break is due to a system timer interrupt.

\* \* \* \* \*